US009647513B2

(12) United States Patent
Park et al.

(10) Patent No.: US 9,647,513 B2
(45) Date of Patent: May 9, 2017

(54) ACTUATOR UNIT, ROBOT INCLUDING THE SAME, AND REDUCING APPARATUS

(71) Applicant: Samsung Electronics Co., Ltd., Suwon-si, Gyeonggi-do (KR)

(72) Inventors: Jung-jun Park, Seoul (KR); Byeong-sang Kim, Suwon-si (KR); Kang-min Park, Hwaseong-si (KR); Jae-chul Hwang, Seoul (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 112 days.

(21) Appl. No.: 14/272,831

(22) Filed: May 8, 2014

(65) Prior Publication Data

US 2015/0100159 A1 Apr. 9, 2015

(30) Foreign Application Priority Data

Oct. 7, 2013 (KR) ........................ 10-2013-0119441

(51) Int. Cl.
| | |
|---|---|
| H02K 11/21 | (2016.01) |
| G06F 19/00 | (2011.01) |
| H02K 11/00 | (2016.01) |
| H02K 7/116 | (2006.01) |
| H02K 7/14 | (2006.01) |
| H02K 11/24 | (2016.01) |
| H02K 11/33 | (2016.01) |
| F16H 57/01 | (2012.01) |
| H02K 5/22 | (2006.01) |

(52) U.S. Cl.
CPC ........ *H02K 11/0073* (2013.01); *H02K 7/116* (2013.01); *H02K 7/14* (2013.01); *H02K 11/21* (2016.01); *H02K 11/24* (2016.01); *H02K 11/33* (2016.01); *F16H 57/01* (2013.01); *G05B 2219/45031* (2013.01); *H02K 5/225* (2013.01); *Y10S 901/23* (2013.01); *Y10T 477/675* (2015.01)

(58) Field of Classification Search
CPC .............................. H02K 7/116; B25J 9/1651
USPC ........... 74/412; 700/245; 318/568.11, 568.21
See application file for complete search history.

(56) References Cited

U.S. PATENT DOCUMENTS

| | | | | |
|---|---|---|---|---|
| 4,518,308 | A | * | 5/1985 | Grzybowski ............ B25J 9/046 414/735 |
| 5,513,946 | A | * | 5/1996 | Sawada .................... B25J 9/042 414/744.5 |
| 6,339,735 | B1 | * | 1/2002 | Peless .................. A01D 34/008 56/10.2 A |
| 6,343,242 | B1 | * | 1/2002 | Nomura ................. B25J 9/1676 318/568.11 |
| 6,483,270 | B1 | * | 11/2002 | Miyazaki ............. G05B 19/231 318/609 |
| 7,105,984 | B2 | * | 9/2006 | Miyazawa ............. H02N 2/004 310/323.02 |

(Continued)

FOREIGN PATENT DOCUMENTS

| | | |
|---|---|---|
| JP | 4022461 B2 | 10/2007 |
| JP | 4096213 B2 | 3/2008 |

(Continued)

*Primary Examiner* — Bentsu Ro
*Assistant Examiner* — Devon Joseph
(74) *Attorney, Agent, or Firm* — Lee & Morse, P.C.

(57) ABSTRACT

An actuator unit, a robot including the same, and a reducing apparatus, the actuator unit including a driving unit; a sensor unit; a control unit; and a frame unit.

21 Claims, 17 Drawing Sheets

(56) References Cited

U.S. PATENT DOCUMENTS

| | | | |
|---|---|---|---|
| 7,752,943 B2 | 7/2010 | Maruyama et al. | |
| 8,179,127 B2* | 5/2012 | West | G01D 5/2046 |
| | | | 324/207.25 |
| 8,210,868 B1* | 7/2012 | Robling | H01R 31/02 |
| | | | 439/502 |
| 9,266,240 B2* | 2/2016 | Shiraki | B25J 9/047 |
| 9,302,389 B2* | 4/2016 | Asada | B25J 9/06 |
| 2003/0035711 A1* | 2/2003 | Gilchrist | H01L 21/68707 |
| | | | 414/744.5 |
| 2004/0012363 A1* | 1/2004 | Simondet | B25J 9/1692 |
| | | | 318/568.21 |
| 2008/0098839 A1* | 5/2008 | Maruyama | H02K 7/116 |

FOREIGN PATENT DOCUMENTS

| | | |
|---|---|---|
| JP | 4575627 B2 | 8/2010 |
| JP | 2010-201606 A | 9/2010 |
| JP | 2011-189422 A | 9/2011 |
| KR | 10-0241141 B1 | 4/2000 |
| KR | 10-0554361 B1 | 2/2006 |

* cited by examiner

ACTUATOR UNIT, ROBOT INCLUDING THE SAME, AND REDUCING APPARATUS

CROSS-REFERENCE TO RELATED APPLICATION

Korean Patent Application No. 10-2013-0119441, filed on Oct. 7, 2013, in the Korean Intellectual Property Office, and entitled: "Actuator Unit, Robot Including The Same, and Reducing Apparatus," is incorporated by reference herein in its entirety.

BACKGROUND

1. Field

Embodiments relate to an actuator unit, a robot including the same, and a reducing apparatus.

2. Description of the Related Art

Robots may be roughly classified into domestic robots and industrial robots. A domestic robot may be used to care for a patient or a child or assist with household chores such as cooking and cleaning. An industrial robot may be used to produce products in a working environment. An industrial robot may have an advantage in that it may repeatedly perform the same work. Industrial robots may include, e.g., mobile robots (that are movable) and robot arms (that are fixed in one place). Robot arms may also be called articulated robots. Horizontal articulated robots may be more widely used, when compared to vertical articulated robots.

SUMMARY

Embodiments are directed to an actuator unit, a robot including the same, and a reducing apparatus.

The embodiments may be realized by providing an actuator unit including a driving unit that includes a motor that generates a rotational force for rotating an object, a decelerator that is connected to the motor and that reduces a rotation speed according to a deceleration ratio, and an encoder that detects rotation information of the motor, wherein the decelerator, the motor, and the encoder are vertically coupled through an input hollow shaft; a sensor unit that includes a sensor frame on which a sensor is mounted, a sensor board that amplifies a signal from the sensor, and a sensor coupling unit that blocks disturbance and noise from the driving unit, the sensor coupling unit being disposed over the driving unit; a control unit that includes a motor controller that controls the motor based on the rotation information of the motor from the encoder, a power converter that converts a current signal from the motor controller into a pulse signal and applies the pulse signal to the motor, and a power supply unit that converts external main power into power suitable for individual elements and that supplies the suitable power, the power supply unit being coupled to the input hollow shaft and under the driving unit; and a frame unit that includes a motor frame that supports the motor, an encoder frame that supports the encoder, and a connection frame that connects the driving unit to the sensor unit.

The control unit may include a single-layer board that is coupled to the input hollow shaft or a multi-layer board that is coupled to the input hollow shaft.

The control unit may include a multi-layer board that is coupled to the input hollow shaft, and the multi-layer board may include a control board on which the motor controller is disposed, an amplification board on which the power converter is disposed, and a power board on which the power supply unit is disposed.

The actuator unit may have a vertically symmetric structure, an input connector may be on a bottom of the actuator unit, an output connector may be on a top of the actuator unit, and the input connector and the output connector may be connected to each other through an internal cable that extends through a hole in a central hollow shaft that is inside the input hollow shaft.

The decelerator may be a harmonic decelerator.

The sensor frame may include a circular upper plate that has a hole into which the central hollow shaft, which is inside the input hollow shaft, is inserted, a cylindrical side unit that extends downwardly from the circular upper plate, and a circular visor that extends outwardly in a horizontal direction from a lower end portion of the cylindrical side unit, the sensor coupling unit is coupled to a bottom surface of the circular upper plate, the sensor board is coupled to a top surface of the circular upper plate, and an external coupling unit is on the circular visor.

The sensor may be a torque sensor that senses torque of the driving unit.

The sensor coupling unit may be between the decelerator and the sensor frame, and the sensor coupling unit generates strain in a rotation direction on the sensor frame by transmitting rotational torque of the decelerator to the sensor frame, and blocks the disturbance by blocking or reducing strain in a direction other than the rotation direction.

The embodiments may be realized by providing an actuator unit including a driving unit that includes a motor that generates a rotational force for rotating an object, a decelerator that is connected to the motor and that reduces a rotation speed according to a deceleration speed, and an encoder that detects rotation information of the motor, wherein the decelerator, the motor, and the encoder are vertically coupled through an input hollow shaft; a sensor unit that includes a sensor frame on which a sensor is mounted, a sensor board that amplifies a signal from the sensor, and a sensor coupling unit that blocks disturbance and noise from the driving unit, and is on the driving unit; and a frame unit that includes a motor frame that supports the motor, an encoder frame that supports the encoder, and a connection frame that connects the driving unit to the sensor unit.

The sensor may be a torque sensor that senses torque of the driving unit, the sensor coupling unit is between the decelerator and the sensor frame, and the sensor coupling unit generates strain in a rotation direction on the sensor frame by transmitting rotational torque of the decelerator to the sensor frame, and blocks the disturbance by blocking or reducing strain in a direction other than the rotation direction.

The sensor coupling unit may include a decelerator flange that is coupled to the decelerator, and a frame flange that is coupled to the sensor frame, the sensor coupling unit has a first rigidity in a rotation direction having the input hollow shaft as a rotational axis, and a second rigidity in vertical and horizontal directions on a horizontal plane perpendicular to the input hollow shaft, the first rigidity is high enough to substantially transmit torque in the rotation direction from the decelerator to the sensor frame, and the second rigidity is low enough to not substantially transmit the disturbance due to strain in the vertical and horizontal directions from the decelerator to the sensor frame.

The frame flange may have a circular annular shape, the decelerator flange has a plurality of protrusions that extend inwardly from an inner side of the circular annular shaped frame flange and that are coupled to the decelerator, the protrusions having bulbous head portions on ends of narrower stem portions, and each of the plurality of protrusions extends in a direction such that the stem forms an acute angle with respect to a tangent line of the circular annular shape of the frame flange.

The frame flange may have a circular annular shape, the decelerator flange includes a plurality of protrusions that extend inwardly in a curved shape in the rotation direction from an inner side of the circular annular shaped frame flange and that are coupled to the decelerator, and each of the plurality of protrusions is formed such that a cross-sectional area increases in a direction away from a portion that is coupled to the frame flange toward an end portion of each protrusion.

The frame flange may have a circular annular shape, the decelerator flange includes a plurality of bridges that connect insides of the circular annular shaped frame flange and that are coupled to the decelerator, and the decelerator flange is formed of an anisotropic material having rigidity in an extension direction in which the plurality of bridges extend that is higher than a rigidity in a direction perpendicular to the extension direction.

The sensor frame may include a circular upper plate that has a hole into which a central hollow shaft that is inside the input hollow shaft is inserted, a cylindrical side unit that extends downwardly from the circular upper plate, and a circular visor that extends outwardly in a horizontal direction from a lower end portion of the cylindrical side unit and that partially covers tops of the driving unit and the frame unit, the sensor coupling unit is coupled to a bottom surface of the circular upper plate, the sensor board is coupled to a top surface of the circular upper plate, and an external coupling unit is formed on the circular visor.

The embodiments may be realized by providing a robot including a base, the base including a high-level controller that generates a control command through computation according to an external task command; a vertical shaft that is inserted into the base and that is vertically moveable; an articulated arm that is coupled to the vertical shaft, the articulated arm including at least two joints and at least one horizontal arm that is connected through the at least two joints; a hand that is coupled to an end joint of the articulated arm, a moving object being holdable in the hand; an actuator unit in each of the at least two joints, the actuator unit rotating the at least one horizontal arm or the hand and including thereinside a control unit that controls rotation; and a communication power cable, the communication power cable including a communication cable that transmits the control command from the high-level controller, and a power cable that supplies power.

The actuator unit may further include a driving unit that includes a motor that generates a rotational force for rotating an object, a decelerator that is connected to the motor and that reduces a rotation speed according to a deceleration ratio, and an encoder that detects rotation information of the motor, wherein the decelerator, the motor, and the encoder are vertically coupled through an input hollow shaft; a sensor unit that includes a sensor frame on which a sensor is mounted, a sensor board that amplifies a signal from the sensor, and a sensor coupling unit that blocks disturbance and noise from the driving unit, the sensor coupling unit being disposed over the driving unit; and a frame unit that includes a motor frame that supports the motor, an encoder frame that supports the encoder, and a connection frame that connects the driving unit to the sensor unit. wherein the control unit includes a motor controller that controls the motor based on the rotation information of the motor from the encoder, a power converter that converts a current signal from the motor controller into a pulse signal and applies the pulse signal to the motor, and a power supply unit that converts external main power into power suitable for individual elements and that supplies the suitable power, the power supply unit being coupled to the input hollow shaft under the driving unit.

The control unit may include a multi-layer board that is coupled to the input hollow shaft, the multi-layer board may include a control board on which the motor controller is disposed, an amplification board on which the power converter is disposed, and a power board on which the power supply unit is disposed.

The communication cable may be connected to the actuator unit of each of the at least two joints in a daisy-chain fashion from the high-level controller.

An input connector may be on a bottom of the actuator unit, an output connector may be on a top of the actuator unit, the input connector and the output connector are connected to each other through an internal cable that extends through a hole in a central hollow shaft that is inside the input hollow shaft, the communication power cable that extends through the inside of the vertical shaft from the high-level controller is connected to the input connector of the actuator unit in the joint to which the vertical shaft is coupled, and the output connector of the actuator unit of one of the two joints is connected through the communication power cable to the input connector of the actuator unit of another of the joints, which actuator units are adjacent to each other.

The sensor coupling unit may be between the decelerator and the sensor frame, the sensor coupling unit has a first rigidity in a rotation direction about the input hollow shaft, and a second rigidity in vertical and horizontal directions on a horizontal plane that is perpendicular to the input hollow shaft, and the second rigidity is less rigid than the first rigidity.

The sensor coupling unit may be formed as any one of a first type that includes a frame flange that has a circular annular shape and that is coupled to the sensor frame, and a decelerator flange that includes a plurality of protrusions that extend inwardly from an inner side of the circular annular shaped frame flange and that are coupled to the decelerator, the protrusions having bulbous head portions on ends of narrower stem portions, the protrusions being coupled to the decelerator through the head portions, a second type that includes a frame flange that has a circular annular shape and that is coupled to the sensor frame, and a decelerator flange that includes a plurality of protrusions that extend inwardly in a curved shape in the rotation direction from an inner side of the circular annular shaped frame flange such that a cross-sectional area increases in a direction away from a portion that is coupled to the frame flange toward an end portion of each protrusion and the decelerator flange is coupled to the decelerator through an end portion of each protrusion, and a third type that includes a frame flange that has a circular annular shape and that is coupled to the sensor frame, and a decelerator flange that includes a plurality of bridges that connect insides of the circular annular shaped frame flange, that is formed of an anisotropic material having a rigidity in an extension direction in which the plurality of bridges extend that is more rigid than a rigidity in a direction perpendicular to the extension direction, and that is coupled to the decelerator through central portions of the plurality of bridges.

The sensor frame may include a circular upper plate that has another hole into which a central hollow shaft that is inside the input hollow shaft is inserted, a cylindrical side unit that extends downwardly from the circular upper plate, and a circular visor that extends outwardly in a horizontal direction from a lower end portion of the cylindrical side unit, the sensor coupling unit is coupled to a bottom surface of the circular upper plate, the sensor board is coupled to a top surface of the circular upper plate, and the horizontal arm is coupled to the circular visor.

The embodiments may be realized by providing a reducing apparatus including a decelerator that is coupled to a motor, the motor generating a rotational force for rotating an object, and the decelerator reducing a rotation speed according to a deceleration ratio; and a sensor unit that includes a sensor coupling unit that is coupled to the decelerator, the sensor coupling unit detecting rotational torque of the decelerator and blocking disturbance and noise, a sensor frame that is coupled to the sensor coupling unit and allows a sensor for detecting the rotational torque to be mounted thereon, and a sensor board on the sensor frame, the sensor board amplifying a signal from the sensor.

The sensor coupling unit may be formed as any one of a first type that includes a frame flange that has a circular annular shape and that is coupled to the sensor frame, and a decelerator flange that includes a plurality of protrusions that extend inwardly from an inner side of the circular annular shaped frame flange and that are coupled to the decelerator, the protrusions having bulbous head portions on ends of narrower stem portions, the protrusions being coupled to the decelerator through the head portions, a second type that includes a frame flange that has a circular annular shape and that is coupled to the sensor frame, and a decelerator flange that includes a plurality of protrusions that extend inwardly in a curved shape in the rotation direction from an inner side of the circular annular shaped frame flange such that a cross-sectional area increases in a direction away from a portion that is coupled to the frame flange toward an end portion of each protrusion and the decelerator flange is coupled to the decelerator through the end portion of each protrusion, and a third type that includes a frame flange that has a circular annular shape and that is coupled to the sensor frame, and a decelerator flange that includes a plurality of bridges that connect insides of the circular annular shaped frame flange, that is formed of an anisotropic material having a rigidity in an extension direction in which the plurality of bridges extend that is more rigid than a rigidity in a direction perpendicular to the extension direction, and that is coupled to the decelerator through central portions of the plurality of bridges.

The sensor frame may include a circular upper plate that has another hole into which a central hollow shaft that is inside the input hollow shaft is inserted, a cylindrical side unit that extends downwardly from the circular upper plate, and a circular visor that extends outwardly in a horizontal direction from a lower end portion of the cylindrical side unit, the sensor coupling unit may be coupled to a bottom surface of the circular upper plate, the sensor board may be coupled to a top surface of the circular upper plate, and an external device that receives rotational torque from the decelerator may be coupled to the circular visor.

BRIEF DESCRIPTION OF THE DRAWINGS

Features will be apparent to those of skill in the art by describing in detail exemplary embodiments with reference to the attached drawings in which.

DETAILED DESCRIPTION

Figure 1A:
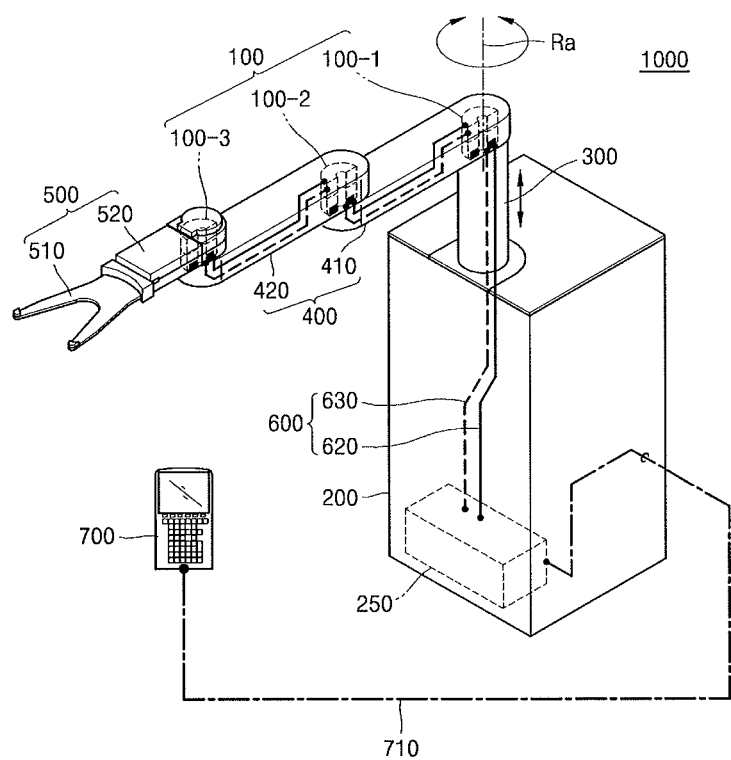
FIG. 1A illustrates a perspective view of a robot including an actuator unit, according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

As used herein, the term "and/or" includes any and all combinations of one or more of the associated listed items. Expressions such as "at least one of," when preceding a list of elements, modify the entire list of elements and do not modify the individual elements of the list.

It will be understood that when an element, such as a layer, a region, or a substrate, is referred to as being "on", "connected to" or "coupled to" another element, it may be directly on, connected or coupled to the other element or intervening elements may be present. Likewise, it will be understood that when an element is disposed on another element, the element may be directly disposed over the other element or another element may be disposed therebetween.

FIG. 1A illustrates a perspective view of a robot 1000 including an actuator unit 100, according to an embodiment.

Referring to FIG. 1A, the robot 1000 may include the actuator unit 100, a base 200, a vertical shaft 300, an articulated arm 400, a hand 500, a communication power cable 600, and a teaching pendent 700.

The actuator unit 100 may be in each of joints of the articulated arm 400, and may rotate first and second horizontal arms 410 and 420 or the hand 500. In the robot 1000 of FIG. 1A, the number of the actuator units 100 may correspond to the number of the first and second horizontal arms 410 and 420 and the hand 500. For example, in the robot 1000 of FIG. 1A, a first actuator unit 100-1 corresponding to the first horizontal arm 410, a second actuator unit 100-2 corresponding to the second horizontal arm 420, and a third actuator unit 100-3 corresponding to the hand 500 may be provided. Except for a case where each of the first actuator unit 100-1, the second actuator unit 100-2, and the third actuator unit 100-3 is mentioned specifically, they may each referred to as the 'actuator unit 100'.

The actuator unit 100 may include a control unit (not shown) and/or a sensor unit (not shown) thereinside. The control unit may be inside the actuator unit 100, and the actuator unit 100 may be connected to a high-level controller 250 in a daisy-chain fashion. The daisy-chain fashion will be explained below in detail with the communication power cable 600. Also, the sensor unit may be inside the actuator unit 100, and improved control (such as precise force control or collision detection) may be provided. The actuator unit 100 will be explained below in detail with reference to FIG. 2.

The base 200 may correspond to or may be a body of the robot 1000, and may include the high-level controller 250 thereinside. Also, the vertical shaft 300 may be inserted into the base 200, and a driving device (not shown) and a control device (not shown) that move and control the vertical shaft 300 may be disposed or provided inside the base 200. The high-level controller 250 inside the base 200 may generate a control command through computation according to an external task command, and may transmit the control command to the control unit of the actuator unit 100 through a communication cable 630. As shown in FIG. 1A, the high-level controller 250 may supply power to each actuator unit 100 through a power cable 620.

The vertical shaft 300 may be inserted into the base 200 as described above, and may vertically move as marked by an arrow due to the driving device. The vertical shaft 300 may have a substantially cylindrical shape as shown in FIG. 1A. The first horizontal arm 410 of the articulated arm 400 may be coupled to a top of the vertical shaft 300. For example, the first horizontal arm 410 may be coupled to the vertical shaft 300 through the first actuator unit 100-1. For example, the first actuator unit 100-1 may be mechanically coupled to the top of the vertical shaft 300, and a right portion of the first horizontal arm 410 may be mechanically coupled to the first actuator unit 100-1. The term "mechanical coupling" used herein may refer to very firm coupling of two objects by using bolts/nuts, rivets, welding, or the like.

The articulated arm 400 may include at least one horizontal arm. For example, in the robot 1000 of FIG. 1A, the articulated arm 400 may include the first horizontal arm 410 and the second horizontal arm 420. One portion of the first horizontal arm 410, e.g., a right end portion of the first horizontal arm 410, may be coupled to the top of the vertical shaft 300 through the first actuator unit 100-1 as described above. Also, a left end portion of the first horizontal arm 410 may be coupled to a right end portion of the second horizontal arm 420 through the second actuator unit 100-2. For example, in a manner similar to that used to couple the first horizontal arm 410 to the vertical shaft 300, the first horizontal arm 410 may be coupled to the second horizontal arm 420 by mechanically coupling the second actuator unit 100-2 to the left end portion of the first horizontal arm 410 and mechanically coupling the right end portion of the second horizontal arm 420 to the second actuator unit 100-2.

The hand 500 may be coupled through the third actuator unit 100-3 to a left end portion of the second horizontal arm 420. For example, the hand 500 may be coupled to the second horizontal arm 420 by mechanically coupling the third actuator unit 100-3 to the left end portion of the second horizontal arm 420 and mechanically coupling a connection unit 520 of the hand 500 to the third actuator unit 100-3.

A portion at which coupling and rotation occur through the actuator unit 100 may be referred to as a joint. Accordingly, the actuator unit 100 may be referred to as being in each joint of the articulated arm 400. The first and second horizontal arms 410 and 420 may not vertically move, and may only horizontally move through the actuator units 100. For example, the first horizontal arm 410 may rotate clockwise or counter-clockwise as marked by an arrow about a rotational axis RA of the first actuator unit 100-1. The rotational axis RA of the first actuator unit 100-1 may be a central hollow shaft 110 (see FIG. 2). The second horizontal arm 420 and the hand 500 may also rotate respectively about rotational axes of the second and third actuator units 100-1 and 100-2.

In an implementation, the articulated arm 400 may include two horizontal arms, e.g., the first and second horizontal arms 410 and 420 in the robot 1000 of FIG. 1A, or the articulated arm 400 may include three or more horizontal arms, or only one horizontal arm.

In an implementation, the robot 1000 may be a horizontal articulated robot having horizontal arms as articulated arms in FIG. 1A, or may include a vertical articulated robot having vertical arms as articulated arms, and the actuator unit 100 may be applied to each of joints of the vertical arms. The vertical arms of the vertical articulated robot vertically rotate unlike horizontal arms, and the actuator unit 100 may be disposed in each joint of the vertical arms such that a central hollow shaft is horizontal.

In an implementation, the robot 1000 may include a complex articulated robot having both horizontal arms and vertical arms as articulated arms. For example, the robot 1000 may include all types of robots having various arms which may rotate about joints. The actuator unit 100 may be disposed in each of joints of the robot.

The hand 500 may include a pickup unit 510 and the connection unit 520. The connection unit 520 of the hand 500 may be coupled to an end of the articulated arm 400, e.g., a left end of the second horizontal arm 420, through the third actuator unit 100-3 as described above.

The pickup unit 510 is a unit that is capable of holding an object (not shown) to be moved, e.g., an object may be holdable in the pickup unit 510 of the hand 500. In FIG. 1A, the pickup unit 510 of the hand 500 may be formed such that a wafer or a substrate may be loaded on the pickup unit 510 as shown in FIG. 1A. In an implementation, the robot 1000 of FIG. 1A may be a wafer or substrate transfer robot that transfers a wafer or a substrate in a semiconductor process, a liquid crystal display (LCD) process, or a light-emitting display (LED) process.

The connection unit 520 may move the object that is loaded on the pickup unit 510 to a target position along with the pickup unit 510 by being integrally coupled to the pickup unit 510 and being rotated by the third actuator unit 100-3. For example, the vertical shaft 300, the first and second horizontal arms 410 and 420 of the articulated arm 400, and the connection unit 520 may interoperate together to move the object that is loaded on the pickup unit 510 to the target position.

In FIG. 1A, the pickup unit 510 of the hand 500 may be formed such that a wafer or a substrate may be loaded on the pickup unit 510 as described above. In an implementation, the pickup unit 510 of the hand 500 may have a tongs-like shape, and thus the pickup unit 510 of the hand 500 may hold the object. A shape of the pickup unit 510 may vary in various ways according to a shape of the object to be moved. In an implementation, when the pickup unit 510 has a tongs-like shape, the connection unit 520 may include a driving device that moves and controls the pickup unit 510 having the tongs-like shape.

In an implementation, the pickup unit 510 or the hand 500 including the pickup unit 510 may have a suitable structure that may be applied to any type of robot including an articulated arm. For example, the pickup unit 510 or the hand 500 including the pickup unit 510 may have a structure that is coupled to an articulated arm and may perform various functions such as assembling, transferring, dispensing, bolt tightening, soldering routing, and welding.

The communication power cable 600 may include the power cable 620 that supplies power, and the communication cable 630 that transmits a control command.

The power cable 620 may supply power to each actuator unit 100 in each joint of the articulated arm 400. For example, the power cable 620 may supply power for driving a driving unit (not shown) and operating the sensor unit (not shown) and the control unit (not shown), in the actuator unit 100.

For example, the power cable 620 may extend from the high-level controller 250 to be connected to the first actuator unit 100-1 on the right portion of the first horizontal arm 410 through the inside of the base 200 and the inside of the vertical shaft 300 and may extend from the first actuator unit 100-1 to be connected to the second actuator unit 100-2 on the right portion of the second horizontal arm 420 through the inside of the first horizontal arm 410. Also, the power cable 620 may extend from the second actuator unit 100-2 to be connected to the third actuator unit 100-3 on the right portion of the connection unit 520 of the hand 500 or on the left portion of the second horizontal arm 420 through the inside of the second horizontal arm 420.

Accordingly, the power cable 620 may be connected to each actuator unit 100 to supply power. Although not shown in FIG. 1A, power may also be supplied through the power cable 620 to the driving device and the control device of the vertical shaft 300.

The communication cable 630 may transmit a control command from the high-level controller 250 to the control unit of each actuator unit 100, and may also to transmit a signal from the control unit or the sensor unit to the high-level controller 250. The communication cable 630 may be connected to each actuator unit 100 from the high-level controller 250, like the power cable 620.

The communication cable 630 may be functionally connected to each actuator unit 100 from the high-level controller 250 in a daisy-chain fashion. The term "daisy-chain fashion" may refer to a fashion in which when interrupt request lines of computer peripheral devices are sequentially connected and the computer peripheral devices simultaneously interrupt a central processing unit (CPU), an interrupt of a peripheral device close to the CPU is first executed. Accordingly, in the daisy-chain fashion, an interrupt of a peripheral device far away from the CPU is masked and blocked. For example, an interrupt of a peripheral device far away from the CPU may be executed when there is no interrupt of a peripheral device close to the CPU. In an implementation, the term "daisy-chain fashion" may refer to a serial connection, e.g., the actuator units 100 may be connected in series (such as a wire running from the high-level controller 250 to the first actuator unit 100-1, through the first actuator unit 100-1, from the first actuator unit 100-1 to the second actuator unit 100-2, through the second actuator unit 100-2, etc.).

In the robot 1000 of FIG. 1A, each actuator unit 100 may include the control unit thereinside, and the actuator units 100 and the high-level controller 250 may be connected in a daisy-chain fashion through the communication cable 630 by using the control units. The actuator units 100 and the high-level controller 250 may be connected in the daisy-chain fashion, and the actuator units 100 may sequentially receive corresponding control commands through their own control units from the high-level controller 250, and may begin to operate through synchronization. For example, when a control command is transmitted from the high-level controller 250, from among the control command, the control unit of the first actuator unit 100-1 may receive a first control command assigned thereto, and then the control unit of the second actuator unit 100-2 may receive a second control command assigned thereto, and finally the control unit of the third actuator unit 100-3 may receive a third control command assigned thereto. The control units of the first through third actuator units 100-1, 100-2, and 100-3 may receive control commands and then be synchronized, and operations according to the control commands may be performed almost at the same time.

If the actuator units 100 and the high-level controller 250 were not connected in a daisy-chain fashion, but are connected, e.g., in a branch configuration, communication cables whose number corresponds to the number of actuator units may be required, and a number of actuator units increases as the number of joints of a robot increases. Thus the number of cables increases. Once the number of cables increases, the cables may be damaged, e.g., twisted, bent, or entangled as the robot moves, thereby reducing control reliability and maintainability of the robot. However, in the robot 1000 of FIG. 1A, the communication cable 630 may be connected in a daisy-chain fashion, the power cable 620 may extend through the control unit of each actuator unit 100, and only two cables, e.g., the power cable 620 and the communication 630, may be used. Accordingly, the robot 1000 of FIG. 1A may reduce the likelihood of damage to cables or quality degradation of cables, even if the number of joints of the robot 1000, e.g., the number of actuator units 100, increases.

A connection relationship between and operations of the power cable 620 and the communication cable 630 in the actuator unit 100 will be explained below in detail with reference to FIGS. 3A through 7.

The teaching pendent 700, which is a device that directly programs and inputs a task command of the robot 1000 desired by a user, may be spaced apart from the base 200. The teaching pendent 700 may be connected to the high-level controller 250 through a task command cable 710 as shown in FIG. 1A. Accordingly, when a task command is input to the teaching pendent 700, the task command may be transmitted to the high-level controller 250 through the task command cable 710. Once the task command is input, the high-level controller 250 may generate a control command for operating the actuator unit 100 by performing various computations, e.g., kinematics, inverse kinematics, kinetics, and a work space variable, and may transmit the control command to the control unit of the actuator unit 100.

Power may be input to the high-level controller 250 through another path, irrespective of the teaching pendent 700, and may be supplied to each actuator unit 100 through the power cable 620. Alternatively, if desired, power may be directly supplied to the actuator unit 100 without passing through the high-level controller 250.

In the robot 1000 of FIG. 1A, the actuator unit 100 in each joint of the articulated arm 400 may include the control unit and/or the sensor unit thereinside. Accordingly, the actuator units 100 and the high-level controller 250 may be connected through the communication power cable 600 by using the control units. For example, the communication cable 630 of the communication power cable 600 may be connected in a daisy-chain fashion through the control unit of each actuator unit 100. Even when the number of actuator units is increased, damage to cables or quality degradation of cables may be reduced and/or prevented due to such connection in the daisy-chain fashion. Also, the actuator unit 100 may be feedback-controlled by using the sensor unit, and improved control such as precise force control or collision detection may be provided.

Figure 1B:
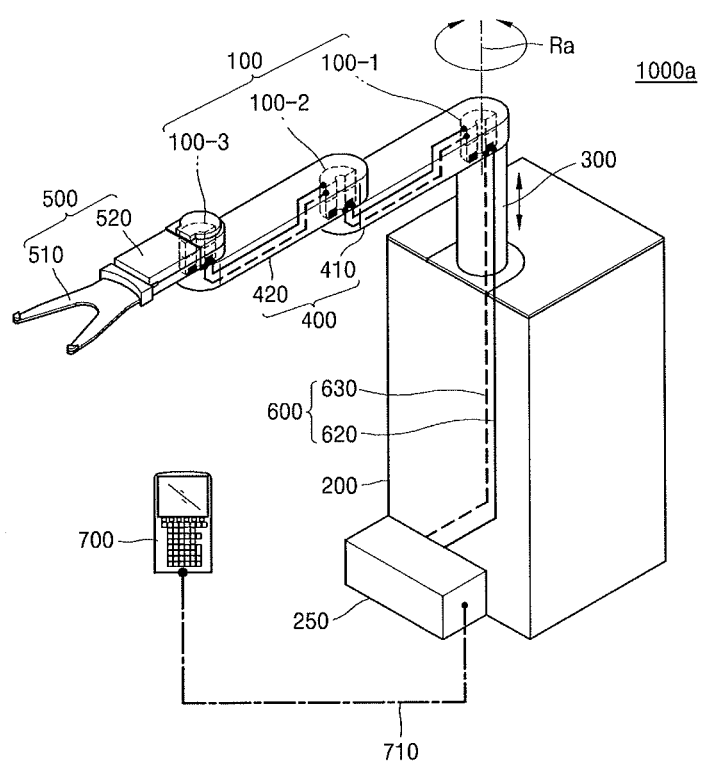
FIG. 1B illustrates a perspective view of a robot including the actuator unit, according to another embodiment.

FIG. 1B illustrates a perspective view of a robot 1000*a* including the actuator unit 100, according to another embodiment. The description already made in FIG. 1A will be briefed or omitted for convenience of explanation.

Referring to FIG. 1B, in the robot 1000*a*, the high-level controller 250 may be outside the base 200, unlike in the robot 1000 of FIG. 1A in which the high-level controller 250 is inside the base 200. The high-level controller 250 may be attached to an outer wall of the base 200. In an implementation, the high-level controller 250 may be spaced apart from the base 200.

In the robot 1000*a* of FIG. 1B, the actuator unit 100 may be in each joint of the articulated arm 400, and each actuator unit 100 may include the control unit and/or a sensor unit thereinside. Also, the high-level controller 250 and the actuator units 100 may be connected in a daisy-chain fashion through the communication cable 630 by using the control units, irrespective of a position of the high-level controller 250.

Figure 2:
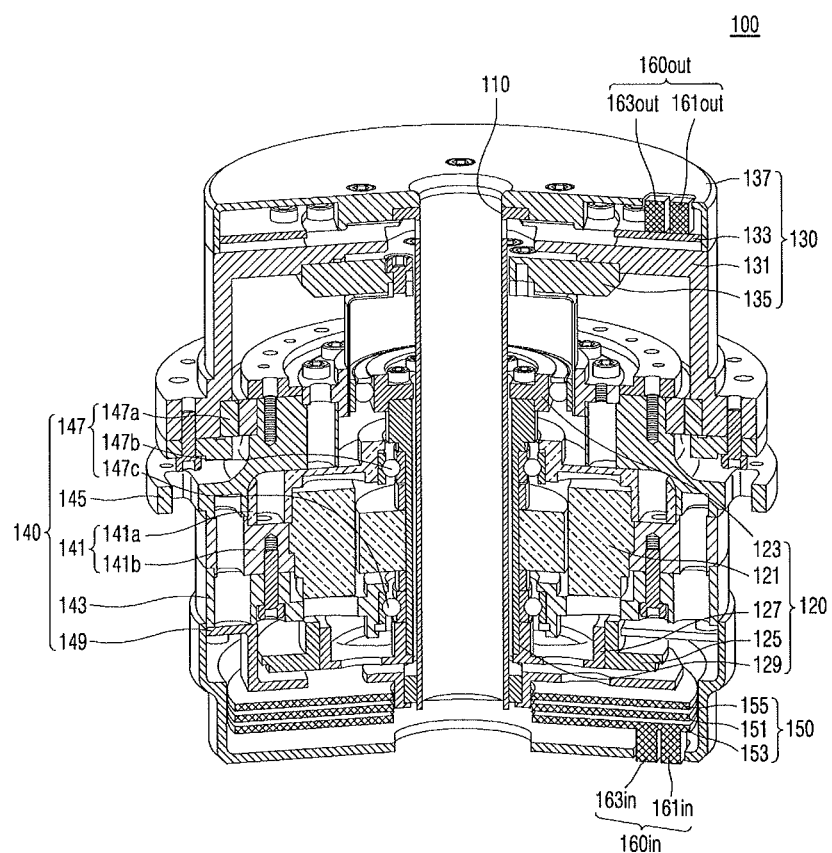
FIG. 2 illustrates a cutaway perspective view of the actuator unit according to an embodiment.

FIG. 2 illustrates a cutaway perspective view of the actuator unit 100 according to an embodiment. The actuator unit 100 of FIG. 2 will be explained with reference to FIGS. 1A and 1B for better understanding.

Referring to FIG. 2, the actuator unit 100 may have a substantially cylindrical shape, and may include the central hollow shaft 110, a driving unit 120, a sensor unit 130, a frame unit 140, and a control unit 150. The actuator unit 100 may have a serial or vertical power transmission structure in which elements are arranged and coupled in series about the central hollow shaft 110.

In the actuator unit 100 having a cylindrical shape, the central hollow shaft 110 may be a shaft having a circular cylindrical shape having a central hole. The central hollow shaft 110 may connect electric wires (such as cables) through the central hole that is an empty space, and twisting or entanglement of the cables due to a rotation may be minimized. Also, the central hollow shaft 110 may be connected to the sensor unit 130, and the central hollow shaft 110 may rotate along with the sensor unit 130. An input hollow shaft 129 may be outside a lower portion of the central hollow shaft 110, most elements may be arranged and coupled in series about the input hollow shaft 129, and the actuator unit 100 may have a vertical power transmission structure. When the actuator unit 100 having the vertical power transmission structure is applied to each joint of the articulated arm 400, a joint driving mechanism of the robot 1000 may become small, lightweight, and simple. The term "joint driving mechanism of a robot" may refer to a structure in which power generated by a motor 121 of the actuator unit 100 is output to a sensor frame 131 of the sensor unit 130 through a harmonic decelerator that is connected by the input hollow shaft 129.

The driving unit 120 may be in a middle portion of the actuator unit 100, and may include the motor 121, a decelerator 123, an encoder 125, and the input hollow shaft 129.

The motor 121 may be a device that converts electrical energy into a mechanical motion by using a force which a conductor through which current flows receives in a magnetic field. In FIG. 2, the motor 121 may provide a rotational force for rotating an object to be moved, e.g., the articulated arm 400 or the hand 500. In FIG. 2, the motor 121 may be a servomotor that operates according to a control signal. Servomotors, which are motors for control having a fast response and a wide speed control range, may be classified into direct current (DC) servomotors and alternating current (AC) servomotors according to power. A servomotor may use a device that receives a control signal, amplifies the control signal, and provides the amplified control signal to the servomotor. The device is referred to as a servo amplifier or a power converter. Also, the encoder 125 that indicates its own current position may be on the servomotor.

The motor 121 may rotate very fast, and when the rotation of the motor 121 is directly transmitted to the object in order to rotate the object, rotational torque great enough to rotate the object may not be transmitted. Also, accurate rotation control may not be provided. Accordingly, the decelerator 123 may reduce a rotation speed of the motor 121 and may transmit a rotational force to the object.

The decelerator 123 may be a device that is coupled to the motor 121 through the input hollow shaft 129 and that reduces a rotation speed according to a deceleration ratio. For example, in the actuator unit 100 of FIG. 2, the decelerator 123 may be a harmonic decelerator that is over the motor 121 and that shares the input hollow shaft 129. For example, a harmonic decelerator may have a structure in which a speed may be reduced in the same rotational shaft, and an inner wheel, an outer wheel, and an elliptical wheel that connects the inner wheel and the outer wheel and generates waves may be engaged with one another, and a deceleration ratio may range from about tens to 1 to hundreds to 1. The harmonic decelerator may also be called a harmonic drive.

In an implementation, the actuator unit 100 may include a decelerator that is coupled to the motor 121 through a belt/pulley. However, when the actuator unit 100 includes the decelerator that is coupled by using the belt/pulley, due to a parallel connection structure (or a horizontal power transmission structure) and the addition of a tension control device, a volume and a weight of the actuator unit 100 may be increased. Also, when the actuator unit 100 having such a structure is on or in an articulated arm, a volume and a weight of the robot 1000 itself may be increased. Moreover, power may be lost or dust may be generated due to a belt/pulley mechanism.

The encoder 125 may detect rotation information, e.g., a rotation direction or a rotation speed, of the motor 121. The encoder 125 may be coupled to the input hollow shaft 129 through an encoder connection unit 127 as shown in FIG. 2. In an implementation, the encoder 125 may be directly coupled to the input hollow shaft 129 without the encoder connection unit 127. Encoders may be roughly classified into incremental encoders and absolute encoders. For reference, an absolute encoder may not need to return to its original state during power re-supply since an absolute value of a rotation angle may be calculated and may be output in units of bits and thus a movement amount may be known during power off, and may be generally expensive since a structure of the absolute encoder is complex. By contrast, an incremental encoder may need to return to its original state during power-resupply since a pulse (a relative value) is output as a rotation angle is changed and thus a movement amount may not be known during power off, and may be inexpensive since a structure of the incremental encoder is simple. In an implementation, the encoder 125 may be an absolute encoder that is under the motor 121. In an implementation, the encoder 125 may be an incremental encoder.

The driving unit 120 may include a brake (not shown) that stops the rotation of the motor 121. In the actuator unit 100 of FIG. 2, the brake may be a safety brake that protects the robot 1000 by stopping the rotation of the motor 121 in an emergency, e.g., power failure. The brake may be on a lowermost end of the driving unit 120.

The input hollow shaft 129 may be outside the lower portion of the central hollow shaft 110 as described above to rotate separately from the central hollow shaft 110. For example, the input hollow shaft 129 may be outside the central hollow shaft 110 such that an inner surface of the input hollow shaft 129 is spaced apart from an outer surface of the central hollow shaft 110. Accordingly, the input hollow shaft 129 and the central hollow shaft 110 may not affect rotation of one another. The motor 121, the decelerator 123, the encoder 125, and the brake (not shown) may be coupled to the input hollow shaft 129. Accordingly, the input hollow shaft 129 may function as a medium that connects the motor 121, the decelerator 123, the encoder 125, and the brake, and also, may become a basic shaft of a vertical power transmission structure of the actuator unit 100 as described above.

The sensor unit 130 may be on or over the driving unit 120, and may include the sensor frame 131, a sensor board 133, a sensor coupling unit 135, and a cover 137.

Sensors (not shown) may be mounted on a top surface of the sensor frame 131. Each of the sensors may be a torque sensor that senses rotational torque transmitted from the decelerator 123. In an implementation, the torque sensor may be a spoke-type torque sensor that uses a strain gauge, and may be mounted on the sensor frame 131. An operation of the strain gauge will now be briefly explained. The sensor frame 131 may be mechanically coupled to the decelerator 123 through the sensor coupling unit 135. In this case, when the decelerator 123 rotates, rotational torque of the decelerator 123 may generate strain in a rotation direction of the sensor frame 131. Accordingly, rotational torque transmitted from the decelerator 123 may be detected by measuring strain that is generated by using the strain gauge attached to the sensor frame 131.

In an implementation, the sensor mounted on the sensor frame 131 may be an acceleration sensor or a tilt sensor mounted on the sensor frame 131. The acceleration sensor or the tilt sensor may monitor a state of the vertical shaft 300, the articulated arm 400, or the hand 500 alone or along with the torque sensor.

The sensor frame 131 may have a top or silk hat-like shape as shown in FIG. 2, and may be formed such that a circular upper plate is coupled to the sensor coupling unit 135 (that is under the sensor frame 131), and a coupling unit (to which the first and second horizontal arms 410 and 420 of the articulated arm 400 may be coupled) may be formed on an outer edge of a side portion, e.g., a circular visor portion. The sensor frame 131 may have a silk or top hat-like shape, may be coupled to the first and second horizontal arms 410 and 420, and strain transmitted from the first and second horizontal arms 410 and 420 may be effectively blocked. Accordingly, the sensors mounted in the sensor frame 131 may effectively sense only rotational torque transmitted from the decelerator 123.

A structure of the sensor frame 131 will be explained below in detail with reference to FIGS. 9A through 10B.

The sensor board 133 may be a signal processing board that includes a plurality of circuits for amplifying a signal measured from the sensors. The sensor board 133 may be directly on or coupled to a top surface of the circular upper plate of the sensor frame 131, and a shortest distance from the sensors may be maintained. Accordingly, the sensor board 133 may efficiently process a sensing signal by minimizing the effect of external noise.

An output connector 160out may be on the sensor board 133 as shown in FIG. 2. The output connector 160out may include a power output connector 161 out and a communication output connector 163out. The output connector 160out may be electrically connected to an input connector 160in on the control unit 150 through an internal cable (not shown). The output connector 160out may contribute to or be a part of the daisy-chain connection between the actuator units 100 along with the input connector 160in. In an implementation, as shown in FIG. 3B, the output connector 160out may be omitted, and a daisy-chain type connection may be achieved only with the input connector 160in.

A cable connection relationship in the actuator unit 100 will be explained below in detail with reference to FIGS. 3A and 3B.

The sensor coupling unit 135 may be a device that blocks disturbance (such as noise and torque ripple) from the driving unit 120, e.g., the decelerator 123. An output of the decelerator 123, e.g., a harmonic decelerator, may be used to drive the first and second horizontal arms 410 and 420 or the hand 500 through the sensor unit 130. A disturbance that is generated due to deformation of a metal elastic body during an operation of the harmonic decelerator may be transmitted to the sensor unit 130. For example, as the harmonic decelerator rotates, not only torque in a rotation direction but also strain in a vertical or horizontal direction (that is generated due to deformation of an elastic body of the harmonic decelerator) may be transmitted to the sensor unit 130.

For example, when a strain gauge is attached to the sensor frame 131 to measure load torque, rotational torque of the harmonic decelerator may generate strain in the rotation direction on the sensor frame 131, and thus torque may be measured by using the strain gauge attached to the sensor frame 131. However, deformation of the harmonic decelerator in a vertical and/or horizontal direction may also generate strain on the sensor frame 131, and the strain may act as disturbance in a load torque signal to be measured.

The team "disturbance" which is an element other than something that causes a direct change in a physical quantity to be controlled in an automatic control system may refer to an external activity that disturbs a state of a control system. For example, disturbance may be an external activity applied to an active element of the control system. By contrast, noise may refer to an external activity applied to a passive element of the control system. Disturbance in relation to the sensor coupling unit 135 of FIG. 2 may refer to translation in three directions and rotation in two directions excluding a direction in which the decelerator 123 rotates.

The sensor frame 131 may be mechanically coupled to the top of the sensor coupling unit 135, and the decelerator 123 may be mechanically coupled to the bottom of the sensor coupling unit 135. Accordingly, rotational torque of the decelerator 123 may be transmitted to the sensor frame 131 through the sensor coupling unit 135. The sensor coupling unit 135 may have relatively high rigidity in a rotation direction in which of the decelerator 123 rotates, and the sensor coupling unit 135 may have relatively low rigidity in vertical and horizontal directions on a horizontal plane perpendicular to the central hollow shaft 110. Accordingly, rotational torque of the decelerator 123 may be substantially transmitted to the sensor frame 131 due to high rigidity, but strain that is generated due to deformation of the decelerator 123 in the vertical and/or horizontal direction may be barely transmitted to the sensor frame 131 due to low rigidity. Accordingly, the sensor unit 130 may measure pure torque information that is not affected by disturbance.

The term "rigidity" used herein may refer to a physical property of a material that it does not bend or flex even when a pressure is applied thereto. For example, rigidity may refer to torsional rigidity. For reference, a relationship N=Dϕ between a torsional moment N and a torsional angle per unit length ϕ, is established and a proportional coefficient D is torsional rigidity. The proportional coefficient D may be proportional to a shearing modulus 'n' of a material, and the proportional coefficient D may be determined according to a cross-sectional shape of a cylinder.

A structure or a function of the sensor coupling unit 135 for blocking disturbance and noise will be explained below in detail with reference to FIGS. 11A through 11D.

The cover 137 may be a structure that covers and protects the sensor board 133. When the actuator unit 100 is in and coupled to each joint of the articulated arm 400 or while the robot 1000 operates, the cover 137 may help prevent the sensor board 133 from being damaged due to an external force or contact of a foreign material. If there is no risk to damage the sensor board 133, the cover 137 may be omitted.

The frame unit 140 may be on an outer edge and coupling portions of the driving unit 120, and may include a motor frame 141, an encoder frame 143, a connection frame 145, and a support bearing 147. The motor frame 141 and the encoder frame 143 may be frames that respectively support the motor 121 and the encoder 125. The motor frame 141 may include an upper motor frame 141*a* that is on or over the motor 121 and that supports the motor 121, and a side motor frame 141*b* that is on an outer surface of the motor 121 and that supports the motor 121. The connection frame 145 may be a frame that connects the driving unit 120 and the sensor unit 130. For example, the connection frame 145 may be between the motor frame 141 and the sensor frame 131 to mechanically couple the driving unit 120 and the sensor unit 130 as shown in FIG. 2.

The support bearing 147 may include a frame support bearing 147*a* that is between the connection frame 145 and the sensor frame 131 and that supports a weight applied to each frame, and hollow shaft support bearings 147*b* and 147*c* that support a weight applied to the input hollow shaft 129. The support bearing 147 may perform not only a support function but also a function of blocking an external force other than that in a rotation direction. Reference numeral 149 may denote a board receiving frame that receives and supports boards of the control unit 150 that is under the board receiving frame.

The control unit 150 may be under the driving unit 120, and may include at least one board. In an implementation, in the actuator unit 100 of FIG. 2, the control unit 150 may include three boards, e.g., a power board 151, a control board 153, and an amplification board 155.

The power board 151 may include a plurality of circuits for power conversion, e.g., a power supply unit. The power supply unit may convert power applied from an external main power supply source into power suitable for elements in the actuator unit 100 and may supply the suitable power.

The control board 153 may include a plurality of control circuits, e.g., a motor controller, for controlling the motor 121 of the actuator unit 100. The motor controller may apply a current reference value to a power converter in the amplification board 155 under feedback control based on the encoder 125 according to a control command received from the high-level controller 250. For example, the motor controller may calculate the current reference value through computation based on rotation information of the motor 121 received from the encoder 125 and may apply the current reference value to the power converter.

The control board 153 may include a communication module, and may communicate with the high-level controller 250 through the communication module. The control board 153 may also communicate with the sensor unit 130 through the communication module. For communication with the sensor unit 130, a sensor interface may be included on the control board 153. In an implementation, the sensor interface may be on the sensor board 133 of the sensor unit 130. In an implementation, for communication with the sensor unit 130, the control board 153 and the sensor board 133 may be electrically connected to each other through a sensor cable 650 as shown in FIG. 3A or 3B.

The amplification board 155 may include a plurality of circuits, e.g., the power converter, for amplifying a control signal, e.g., the current reference value, from the motor controller. The power converter may convert the current reference value applied from the motor controller into a pulse signal for driving the motor 121, and may apply the pulse signal to the motor 121.

In an implementation, the control unit 150 may have a structure in which the control board 153, the power board 151, and the amplification board 155 are sequentially stacked upwardly. In an implementation, the boards may be stacked in suitable order as long as the boards are electrically connected to one another. The boards of the control unit 150 may be stacked to be spaced apart from each other by a predetermined interval as shown in FIG. 2. As such, a structure in which functional units of the control unit 150 are boards, and the boards may be stacked to be spaced apart from each other may be referred to as a distributed board structure. Even if the control unit 150 is integrated and miniaturized, noise and heat may be minimized due to the distributed board structure of the control unit 150.

The control board 153 may be provided with the input connector 160in to correspond to the output connector 160out of the sensor board 133 of the sensor unit 130. The input connector 160in may include a power input connector 161in and a communication input connector 163in. The input connector 160in may be electrically connected to the output connector 160out through an internal cable in a daisy-chain fashion as described above. If a board other than the control board 153, e.g., the power board 151, is a lowermost board, the power board 151 may be provided with the input connector 160in.

A structure or a function of the control unit 150 will be explained below in detail with reference to FIGS. 7 through 8C.

The actuator unit 100 of FIG. 2 may have a vertical power transmission structure in which all elements are arranged and coupled in series about the input hollow shaft 129. Due to the vertical power transmission structure, the actuator unit 100 may be made small, lightweight, and simple. Also, all of the elements may be integrated into a module, and maintainability may be improved. Furthermore, a power transmission mechanism may be simplified, and power transmission efficiency may be improved. When the actuator unit 100 (having the vertical power transmission structure) is applied to each joint of the robot 1000, a joint driving mechanism of the robot 100 may become small, lightweight, and simple, and high-speed operation and energy saving may be ensured.

Also, the actuator unit 100 of FIG. 2 may include the control unit 150 thereinside, and the high-level controller 250 and the plurality of actuators 100 may be connected in a daisy-chain fashion through the communication power cable 600, e.g., the communication cable 630, by using the control units 150. Accordingly, only two cables, e.g., the power cable 620 and the communication cable 630, may be required irrespective of the number of the actuator units 100 that are used, and drawbacks due to an increase in the number of cables may be avoided.

The actuator unit 100 of FIG. 2 may include the sensor unit 130 thereinside, may detect and control an operation of the driving unit 120 by using a sensor, and improved control such as precise force control, collision detection, or state monitoring of the robot 1000 may be provided.

Figure 3A:
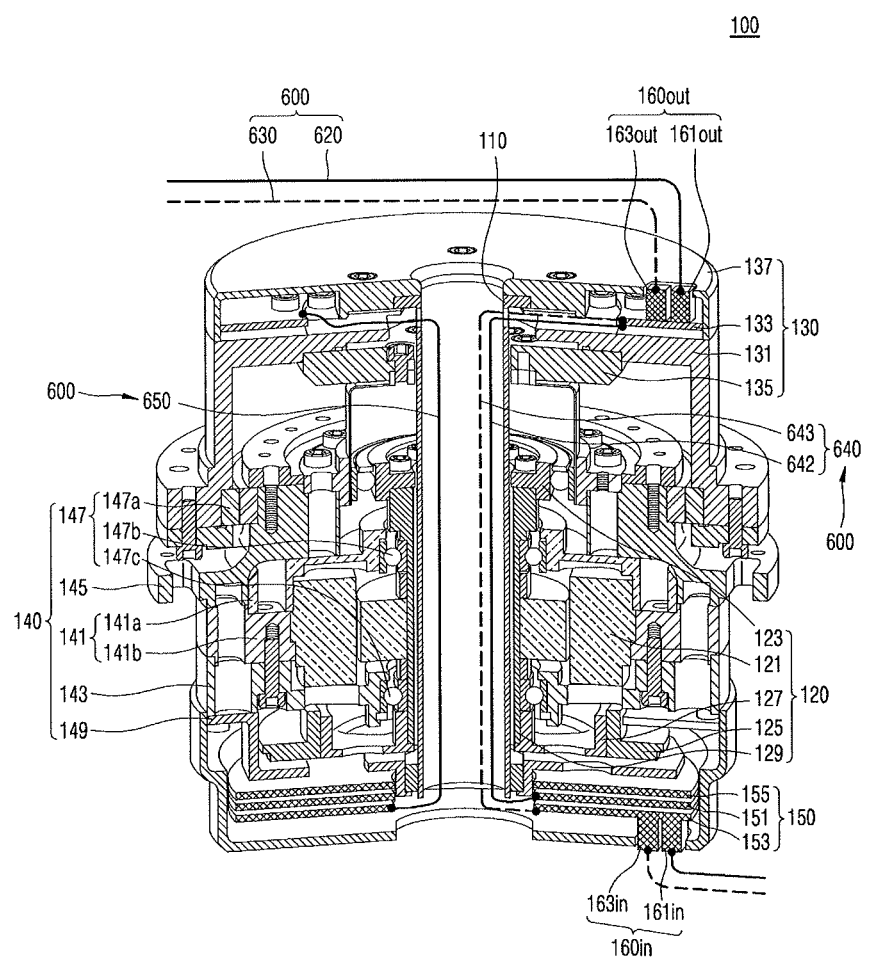
FIGS. 3A through 3B illustrate cutaway perspective views of a cable connection structure of the actuator unit of FIG. 2.
Figure 3B:
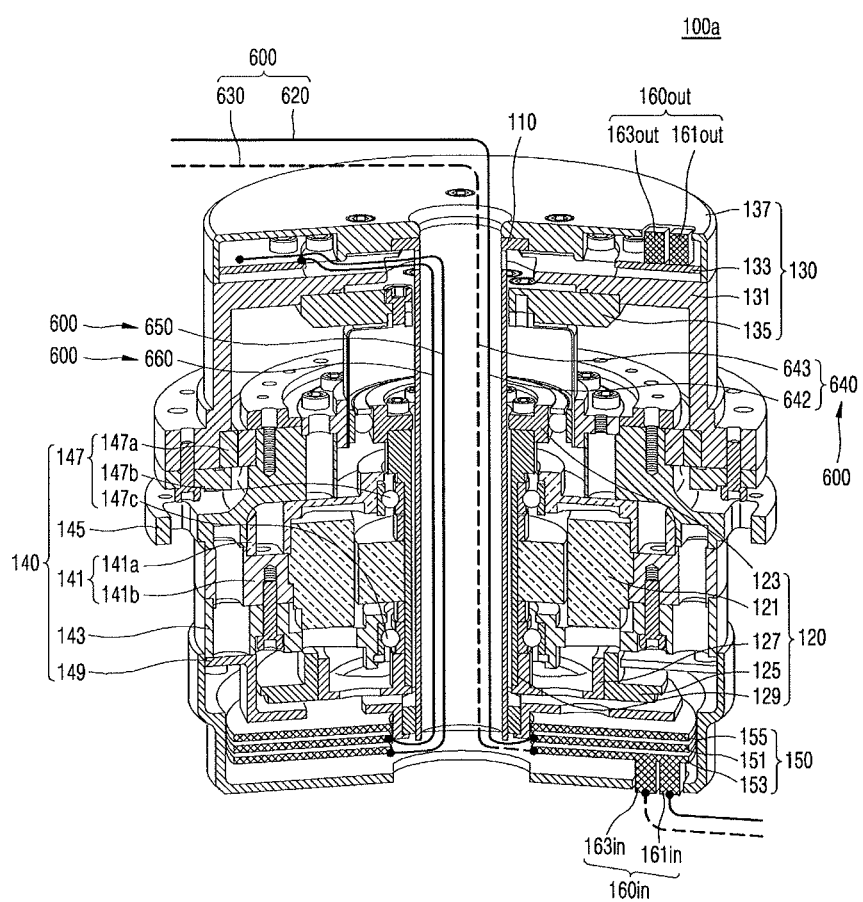

FIGS. 3A and 3B illustrate cutaway perspective views illustrating a cable connection structure of the actuator unit 100 of FIG. 2. The cable connection structure will be explained with reference to FIGS. 1A, 1B, and 2 for better understanding. Also, the description already made in FIG. 2 may be briefed or omitted for convenience of explanation.

Referring to FIG. 3A, the control board 153 of the control unit 150 may be provided with the input connector 160in, and the sensor board 133 of the sensor unit 130 may be provided with the output connector 160out. The input connector 160in may include the power input connector 161in and the communication input connector 163in, and the output connector 160out may include the power output connector 161 out and the communication output connector 163out.

The communication power cable 600 (that extends from another actuator 100 or the high-level controller 250) may be connected to the input connector 160in. For example, the power cable 620 may be connected to the power input connector 161 in to be supplied with power, and the communication cable 630 may be connected to the communication input connector 163in to receive a control command from the high-level controller 250. The communication power cable 600 that extends to another actuator unit 100 may be connected to the output connector 160out. For example, the power cable 620 may be connected to the power output connector 161 out to supply power to another actuator unit 100, and the communication cable 630 may be connected to the communication output connector 163out to transmit a control command from the high-level controller 250.

The input connector 160in and the output connector 160out may be electrically connected to each other through an internal cable 640 as shown in FIG. 3A. The internal cable 640 (which may be a part of the communication power cable 600) may include an internal power cable 642 that corresponds to the power cable 620 and an internal communication cable 643 that corresponds to the communication cable 630. For example, the internal power cable 642 may be connected between the power board 151 of the control unit 150 and the sensor board 133 of the sensor unit 130, the power board 151 may be connected to the power input connector 161 in, and the sensor board 133 may be connected to the power output connector 161out, to electrically connect the power input connector 161 in and the power output connector 161 out. Also, the internal communication cable 643 may be connected between the control board 153 of the control unit 150 and the sensor board 133 of the sensor unit 130, the control board 153 may be connected to the communication input connector 163in, and the sensor board 133 may be connected to the communication output connector 163out, to electrically connect the communication input connector 163in and the communication output connector 163out.

In addition, if an electrical connection relationship between the input connector 160in and the output connector 160out through the internal cable 640 is maintained through boards, the internal cable 640 may extend from at least one of three boards, e.g., the power board 151, the control board 153, and the amplification board 155. For example, both the internal power cable 642 and the internal communication cable 643 may extend from the control board 153 on which the input connector 160in is disposed, to be connected to the sensor board 133.

The sensor board 133 may be electrically connected to the control board 153 through the sensor cable 650 as shown in FIG. 3A. The sensor cable 650 may be a part of the communication power cable 600, and the control board 153 may receive amplified sensing signals from the sensor board 133 through the sensor cable 650. The received sensing signals may be transmitted to the high-level controller 250 through the communication module, and the high-level controller 250 may generate a new control command according to the sensing signals, and may transmit the new control command to the motor controller of the actuator unit 100.

Referring to FIG. 3B, the actuator unit 100a may be different from the actuator unit 100 of FIG. 3A in a position of a connector and a cable connection relationship. For example, in the actuator unit 100a of FIG. 3B, an output connector may be omitted from the sensor board 133 of the sensor unit 130. Accordingly, one actuator unit 100a may be directly connected to the input connector 160in of another actuator unit 100a through the communication power cable 600 without an internal cable. In an implementation, the communication power cable 600 may extend through the central hollow shaft 110 in order to be prevented from being entangled or twisted.

For example, the power cable 620 may extend from the power board 151 of one actuator unit 100a to be connected to the power input connector 161 in of another actuator unit 100a. Also, the communication cable 630 may extend from the control board 153 of one actuator unit 100a to be connected to the communication input connector 163in of another actuator unit 100a. Also, the communication power cable 600 may extend from at least one of three boards, e.g., the power board 151, the control board 153, and the amplification board 155. For example, both the power cable 620 and the communication cable 630 may extend from the control board 153 on which the input connector 160in is disposed, to be connected to the input connector 160in of another actuator unit 100a.

Like in the actuator unit 100 of FIG. 3A, the sensor board 133 may be connected through the first sensor cable 650 to the control board 153. Also, the power board 151 may be connected through the second sensor cable 660 to the sensor board 133 to supply power to the sensor board 133.

In the actuator unit 100a of FIG. 3B, the high-level control unit 250 and the actuator units 100a may be connected in a daisy-chain fashion without an output connector and an internal cable. As a result, in the daisy-chain fashion, the high-level controller 250 and the control boards 153 of the actuator units 100a may be sequentially connected through the communication power cable 600, e.g., the communication cable 630, in a chain fashion, and the control boards 153 may sequentially receive control commands assigned thereto through their communication modules.

Figure 4:
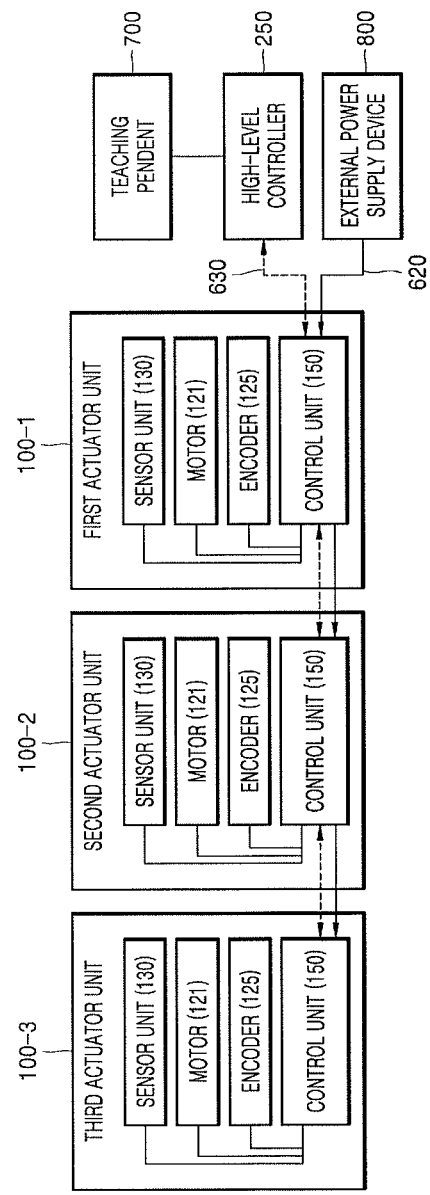
FIG. 4 illustrates a block diagram of a structure in which a plurality of actuator units are connected through a cable, according to an embodiment.

FIG. 4 illustrates a block diagram of a structure in which actuator units are connected through a cable, according to an embodiment. The structure will be explained with reference to FIGS. 1A, 1B, and 2 for better understanding.

Referring to FIG. 4, first, power may be supplied from an external power supply device 800 through the power cable 620 to the control units 150 of the actuator units 100. For example, power may be supplied to the control unit 150 of the first actuator unit 100-1 through the power cable 620, supplied to the control unit 150 of the second actuator unit 100-2, and supplied to the control unit 150 of the third actuator unit 100-3.

Power of each of the actuator units 100 may be supplied to the power supply unit in the power board 151 of the control unit 150, and the power supply unit may convert the received power into power suitable for elements in the actuator unit 100 and may supply the suitable power to the elements. Only representative elements using power are shown in FIG. 4. For example, the motor 121 and the encoder 125 of the driving unit 120 may use power, and the sensor unit 130 may also use power. In the sensor 130, e.g., the sensor board 133 and the sensor mounted on the sensor frame 131 may use power. In an implementation, elements in the control unit 150, e.g., the communication module, the motor controller, the power converter, and the sensor interface, may use power.

In addition, power supplied to the power boards 151 of the control units 150 of the actuator units 100 may be the same. For example, the power boards may be connected in parallel to the external power supply device 800. In an implementation, power may be directly supplied from the external power supply device 800 through the power cable 620 as shown in FIG. 4, of power may be supplied through the high-level controller 250 as shown in FIG. 1A.

Next, based on a task command input to the teaching pendent 700, control commands may be sequentially input in a daisy-chain fashion to the actuator units 100 through the communication cable 630 from the high-level controller 250. For example, the control commands may be first transmitted to the control unit 150 of the first actuator unit 100-1 through the communication cable 630, and then may be transmitted to the control unit 150 of the second actuator unit 100-2, and finally may be transmitted to the control unit 150 of the third actuator unit 100-3.

A control command of the actuator unit 100 may be input to the motor controller through the communication module in the control board 153 of the control unit 150. From among control commands input from the high-level controller 250, the communication module may transmit a first control command assigned to the actuator unit 100, e.g., the first actuator unit 100-1, to the motor controller. The motor controller 250 may apply a current reference value to the power converter in the amplification board 155 under feedback control based on the encoder 125 according to the control command as described above, and the power converter may convert the current reference value into a pulse signal for driving the motor 121 and may apply the pulse signal to the motor 121. The control unit 150 may receive a sensing signal from the sensor unit 130 and may transmit the sensing signal to the high-level controller 250 through the communication module, so that the high-level controller 250 may generate a new control command by using the sensing signal.

In addition, the control commands may be sequentially supplied to the control boards 153 of the control units 150 of the actuator units 100, only a corresponding control command is selectively transmitted to the motor controller through each communication module in the control board 153, and there may be no problem in driving each actuator unit 100. For example, the high-level controller 250 may input all control commands in parallel to the control units 150 of the actuator units 100, and each control unit 150 may selectively receive only a corresponding control command from among all of the control commands and may drive its own driving unit.

Figure 5A:
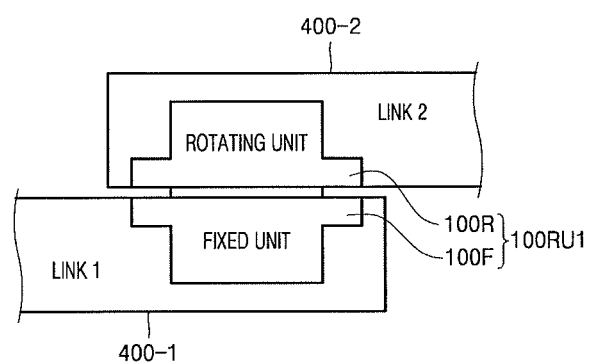
FIGS. 5A and 5B illustrate conceptual diagrams of a structure of a link unit including a rotating unit and a fixed unit in a joint of the robot.
Figure 5B:
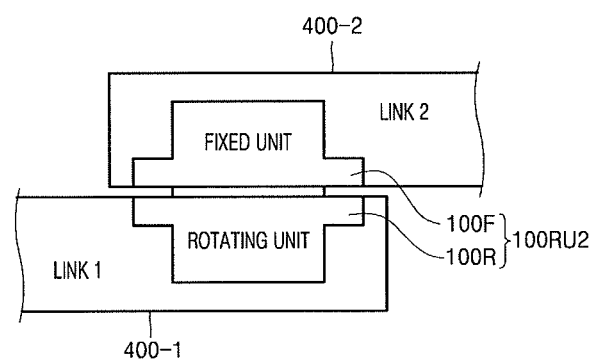

FIGS. 5A and 5B illustrate conceptual diagrams of a structure of a link unit including a rotating unit and a fixed unit in a joint of the robot 1000. The structure will be explained with reference to FIGS. 1A, 1B, and 2 for better understanding.

Referring to FIGS. 5A and 5B, a joint of the robot 1000 may have a structure in which vertical links, e.g., a link 1 400-1 that is a lower link and a link 2 400-2 that is an upper link, are coupled to each other through each of first and second link units 100RU1 and 100RU2. For example, in FIGS. 5A and 5B, the first and second link units 100RU1 and 100RU2 may correspond to the actuator unit 100, and the link 1 400-1 may correspond to one horizontal arm of the articulated arm 400, and the link 2 400-2 may correspond to another horizontal arm that is coupled to the one horizontal arm.

A coupling or link structure of a joint of the robot 1000 may be a structure in which one link is fixed and the other link rotates. Which link is fixed and which link rotates from among two links may vary according to a structure of each of the first and second link units 100RU1 and 100RU2 and/or a user's intention.

The first and second link units 100RU1 and 100RU2 may be vertically symmetric as shown in FIGS. 5A and 5B. The first and second link units 100RU1 and 100RU2 may be vertically symmetric, and the rotating unit may be simply designed and a volume of each of the first and second link units 100RU1 and 100RU2 may be reduced. Accordingly, a volume of a joint of the robot 1000 to which the first and second link units 100RU1 and 100RU2 are applied may be minimized.

Structures of the first and second link units 100RU1 and 100RU2 of FIGS. 5A and 5B may not represent different actuator units 100, and may be structures for explaining two rotation modes in one actuator unit 100. For example, a structure of the first link unit 100RU1 of FIG. 5A shows a first rotation mode in which the link 1 400-1 is fixed and the link 2 400-2 rotates. In the first rotation mode, an upper unit of the first link unit 100RU1 may be a rotating unit 100R that may rotate, and a lower unit of the first link unit 100RU1 may be a fixed unit 100F that may not move. The link 2 400-2 may be mechanically coupled and fixed to the rotating unit 100R so that the link 2 400-2 may rotate as the rotating unit 100R rotates. The link 1 400-1 may be mechanically coupled and fixed to the fixed unit 100F. However, in the first rotation mode, since the fixed unit 100F does not rotate, the link 1 400-1 may not rotate.

A structure of the second link unit 100RU2 of FIG. 5B shows a second rotation mode in which the link 2 400-2 is fixed and the link 1 400-1 rotates. In the second rotation mode, a lower unit of the second link unit 100RU2 may be a rotating unit 100R that may rotate, and an upper unit of the second link unit 100RU2 may be a fixed unit 100F that may not move. Also, based on the same principle as that described for the first link unit 100RU1 in the first rotation mode, the link 1 400-1 may be mechanically coupled to the rotating unit 100R to rotate, and the link 2 400-2 may be mechanically coupled and fixed to the fixed unit 100F not to rotate.

In FIGS. 5A and 5B, the actuator unit 100 may use any one of the first rotation mode and the second rotation mode so that any one of the link 1 400-1 and the link 2 400-2 may rotate. For example, when the first rotation mode of the first link unit 100RU1 of FIG. 5A is used, the sensor frame 131 of the actuator unit 100 may correspond to the rotating unit 100R, and a lower portion including the motor support frame 141 may correspond to the fixed unit 100F.

Figure 6A:
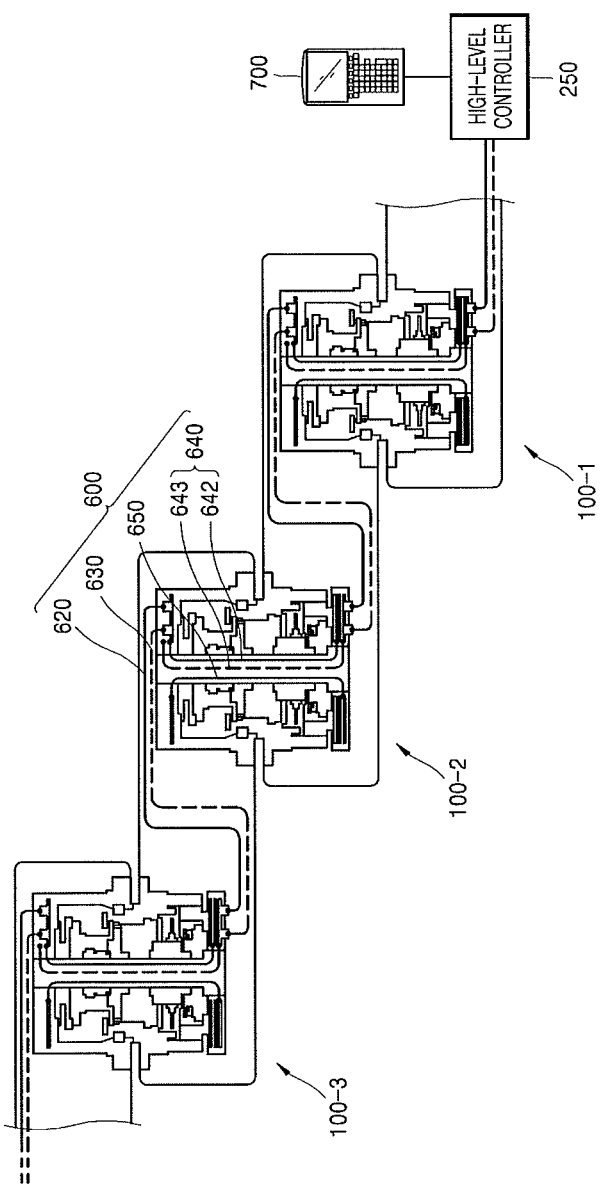
FIG. 6A illustrates a conceptual view of the cable connection structure of FIG. 3A and a structure in which a plurality of actuator units are connected based on a vertical symmetric structure of the link unit of FIG. 5A.

FIG. 6A illustrates a conceptual view of the cable connection structure of FIG. 3A and a structure in which a plurality of actuator units are connected in the robot 1000 based on a vertical symmetric structure of the link unit of FIG. 5A. The following will be explained with reference to FIGS. 1A, 1B, 2, 3A, and 5A for better understanding.

Referring to FIG. 6A, the communication power cable 600 (extending from the high-level controller 250) may be connected to the first actuator unit 100-1. For example, the power cable 620 may extend from the high-level controller 250 and may be connected to the power input connector 161in on the control board 153 of the control unit 150 in the first actuator unit 100-1. Also, the communication cable 630 may extend from the high-level controller 250 and may be connected to the communication input connector 163in on the control board 153 of the control unit 150 in the first actuator unit 100-1. The power input connector 161in and the communication input connector 163in may be electrically connected to the power output connector 161 out and the communication output connector 163out on the sensor board 133 through the internal power cable 642 and the internal communication cable 643 that extend through the inside of the central hollow shaft 110. Also, the sensor board 133 may be connected to the control board 153 through the sensor cable 650 that extends through the central hollow shaft 110.

The first actuator unit 100-1 may be in a joint at which the vertical shaft 300 and the first horizontal arm 410 of the articulated arm 400 are coupled to each other. In an implementation, the first actuator unit 100-1 may be in a joint between horizontal arms.

The output connector 160out of the first actuator unit 100-1 may be connected to the input connector 160in of the second actuator unit 100-2. Again, the input connector 160in of the second actuator unit 100-2 may be connected to the output connector 160out through the internal cable 640. Likewise, the input connector 160in of the third actuator unit 100-3 may be connected through the internal cable 640 to the output connector 160out. If the hand 500 is coupled to the third actuator unit 100-3, the internal cable 640, the output connector 160out, and the communication power cable 600 (that extends from the output connector 160out) may not be necessary.

In FIG. 6A, the actuator unit 100 may have a vertical power transmission structure about the input hollow shaft 129, and a vertical symmetric structure of the rotating unit and the fixed unit, and the input/output connectors 160in and 160out that are in a lower portion and a upper portion, a cable connection between the actuator units 100 may be very simplified as shown in FIG. 6A. Accordingly, even when the number of the actuator units 100 increases, drawbacks due to an increase in the number of cables may be avoided.

Figure 6B:
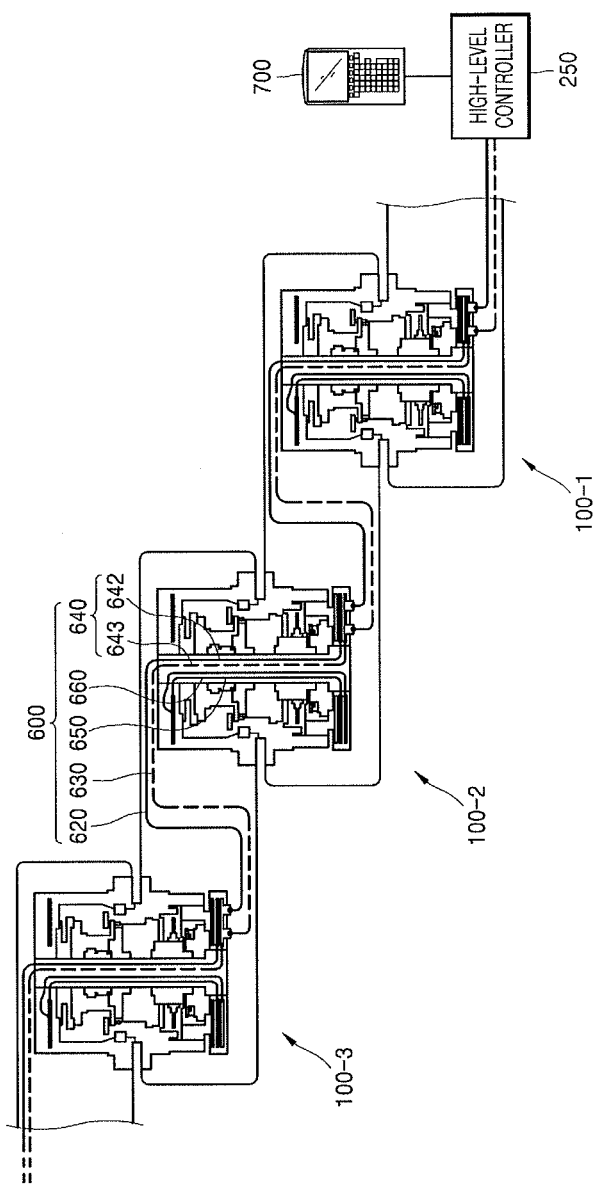
FIG. 6B illustrates a conceptual view of a structure in which a plurality of actuator units are connected through a cable in the robot based on the cable connection structure of FIG. 3B, unlike in FIG. 6A.

FIG. 6B illustrates a conceptual view of a structure in which a plurality of actuator units are connected through a cable in the robot 1000 based on the cable connection structure of FIG. 3B, unlike in FIG. 6A. The description already made in FIG. 6A may be briefed or omitted. The following will be explained with reference to FIGS. 1A, 1B, 2, 3B, and 5A for better understanding.

The actuator unit 100a having the cable connection structure of FIG. 3B may be applied to the cable connection structure of FIG. 6B. For example, the power cable 620 may extend from the high-level controller 250 and may be connected to the power input connector 161in on the control unit 150 in the first actuator unit 100-1. Also, the communication cable 630 may extend from the high-level controller 250 and may be connected to the communication input connector 163in on the control unit 150 in the first actuator unit 100-1.

The power input connector 161in may be connected to the power board 151, and the power cable 620 that extends from the power board 151 may be connected to the power input connector 161in of the second actuator unit 100-2. Also, the communication input connector 163in may be connected to the control board 153, and the communication cable 630 that extends from the control board 153 may be connected to the communication input connector 163in of the second actuator unit 100-2. The power cable 620 and the communication cable 630 may extend through the central hollow shaft 110, and may also extend into a horizontal arm. The sensor board 133 may be connected to the control board 153 and the power board 151 through the first sensor cable 650 and the second sensor cable 660 that extend through the central hollow shaft 110.

Again, the input connector 160in of the second actuator unit 100-2 may be connected to the input connector 160in of the third actuator unit 100-3 through the communication power cable 600. If the hand 500 is coupled to the third actuator unit 100-3, the communication power cable 600 that extends through the central hollow shaft 110 from the control unit 150 may not be necessary.

The actuator unit 100a of FIG. 6B may have a vertical power transmission structure about the input hollow shaft 129, and a vertical symmetric structure of the rotating unit and the fixed unit, and the input connector 160in in a lower portion, a cable connection between the actuator units 100 may be very simplified as shown in FIG. 6B. Accordingly, even when the number of the actuator units 100 increases, drawbacks due to an increase in the number of cables may be avoided.

Figure 7:
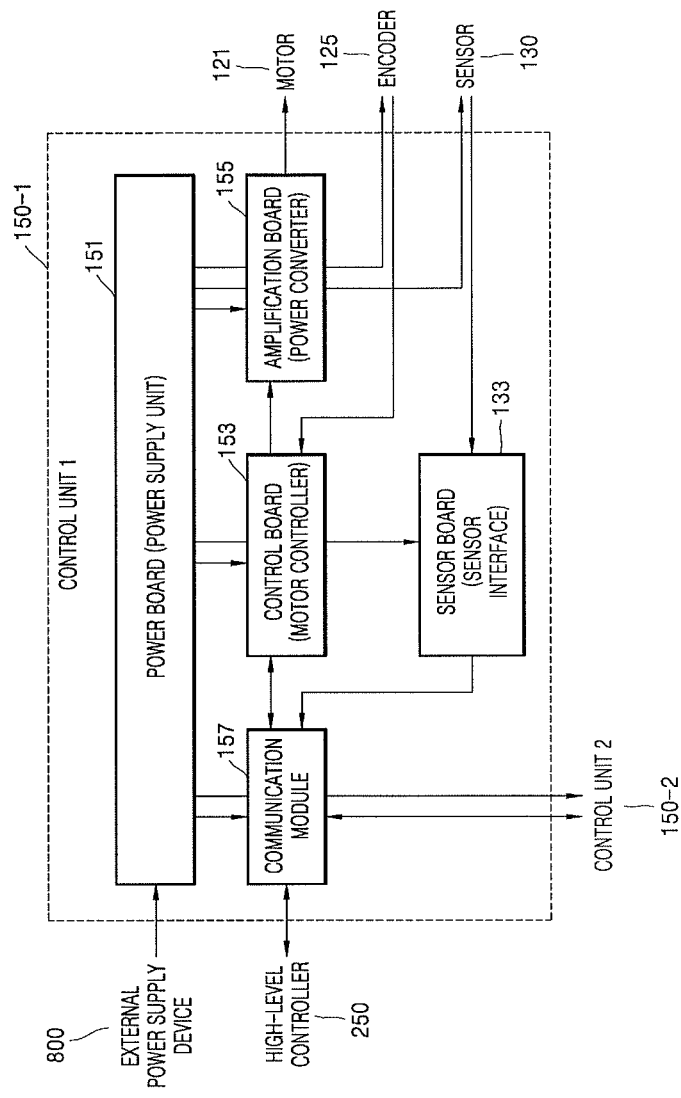
FIG. 7 illustrates a block diagram of a connection relationship between boards of a control unit and sensor boards of a sensor unit of the actuator unit of FIG. 2.

FIG. 7 illustrates a block diagram of a connection relationship between sensor boards of the sensor unit 130 and boards of the control unit 150 of the actuator unit 100 of FIG. 2. The following will be explained with reference to FIGS. 1A, 1B, 2, 3A, and 3B for better understanding.

Referring to FIG. 7, when main power is supplied from the external power supply device 800 to the power board 151 of a control unit 1 150-1, the power supply unit in the power board 151 may convert the main power into power suitable for elements in the actuator unit 100 and may supply the suitable power. For example, the power supply unit may supply the suitable power to the communication module 157, the control board 153, the amplification board 155, the sensor board 133, the encoder 125, and the sensor of the sensor frame 131.

Power from the external power supply device 800 may be applied in parallel to the power board 151 of the control unit 2 150-2 of another actuator unit 100 as marked by an arrow that passes leftward and downward through the communication module 157.

When a control command is input from the high-level controller 250 to a control unit 1 150-1 of the actuator unit 100, the communication module 157 may select the control command assigned to the corresponding actuator unit 100 and may transmit the control command to the motor controller of the control board 153. The motor controller may transmit a current reference value under feedback control based on the encoder 125 to the power converter of the amplification board 155. Rotation information of the motor 121 from the encoder 125 may be input to the control board 153 as marked by an arrow. The power converter may convert the received current reference value into a pulse signal for driving the motor 121 and may apply the pulse signal to the motor 121.

A control command from the high-level controller 250 may be input in parallel to a control unit 2 150-2 through the communication unit 157 as marked by arrows under the communication module 157, and the communication module 157 of the control unit 2 150-2 may select the control command assigned to the corresponding actuator unit 100 and may transmit the control command to the motor controller of the control board 153.

A signal sensed by the sensor may be stored in and corrected by the sensor interface of the sensor board 133, and may be transmitted through the communication module 157 to the high-level controller 250. The high-level controller 250 may generate a new control command by using the received sensing signal, and may input the new control command into the control unit 1 150-1, and improved precise force control, collision prevention, and state monitoring for the actuator unit 100 may be provided. In an implementation, the sensor interface may be on the sensor board 133 or may be on the control board 153.

In an implementation, the communication module 157 may be separated from the control board 153 in FIG. 7 (e.g., to clarify a signal transmission process), or the communication module 157 may be on the control board 153. In an implementation, the communication module 157 may be separately on an additional board, or may be on another board such as the power board 151 or the amplification board 155.

In an implementation, the sensor board 133 may be included in the control unit 1 150-1 (to clarify a signal transmission process), or the sensor board 133 may be on a top surface of the sensor frame 131 and may be included in the sensor unit 130 as shown in FIG. 2. In an implementation, the sensor board 133 may be included in the control unit 150 as shown in FIG. 8C.

Figure 8A:
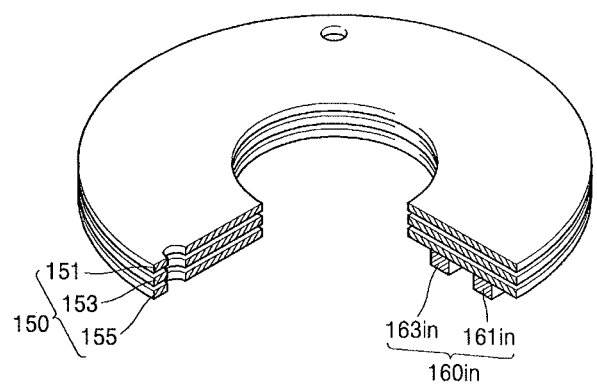
FIGS. 8A through 8C illustrate perspective views of a board structure of the control unit of the actuator unit of FIG. 2.
Figure 8B:
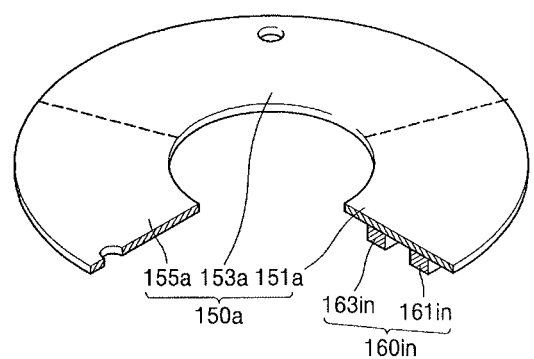
Figure 8C:
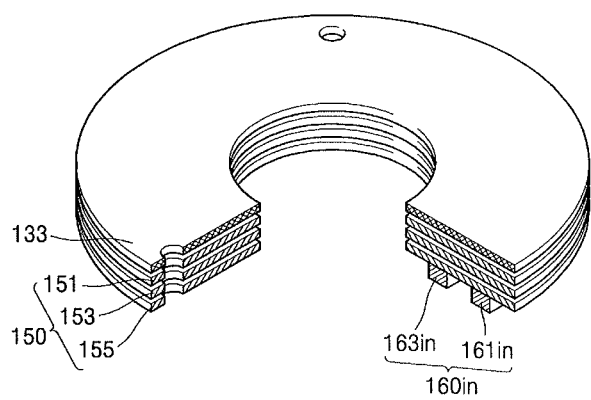

FIGS. 8A through 8C illustrate perspective views of a board structure of the control unit 150 of the actuator unit 100 of FIG. 2. The following will be explained with reference to FIGS. 1A, 1B, 2, 3A, and 3B for better understanding.

Referring to FIG. 8A, in the actuator unit 100, the control unit 150 may have a structure in which a plurality of boards are stacked. For example, the control unit 150 may include the power board 151, the control board 153, and the amplification board 155, and the amplification board 155, the control board 153, and the power board 151 may be sequentially stacked upwardly. In an implementation, the control board 153, the power board 151, and the amplification board 155 may be sequentially stacked as shown in FIG. 2.

The power board 151, the control board 153, and the amplification board 155 may be stacked to be spaced apart from each other in order to help prevent noise during signal processing. Also, each of the power board 151, the control board 153, and the amplification board 155 may be coupled to the board receiving frame 149, and may have a substantially disk shape that has a central through-hole in order to be disposed in the actuator unit 100 having a cylindrical shape.

Although not shown in FIG. 8A, a terminal that is connected to the internal power cable 642 may be on the power board 151, and a terminal that is connected to the internal communication cable 643 may be on the control board 153. Also, a terminal that is connected to the sensor cable 650 may be on the control board 153. Terminals that may be connected to the internal power cable 642, the internal communication cable 643, and the sensor cable 650 may be disposed on the sensor board 133.

Referring to FIG. 8B, in the actuator unit 100, a control unit 150a may include one board. When the control unit 150a includes one board, the control unit 150a may be divided into a power sector 151a on which the power supply unit is disposed, a control sector 153a on which the motor controller is disposed, and an amplification sector 155a on which the power converter is disposed. The communication module may be on the control sector 153a, and the input connector 160in may be on the power sector 151a. In an implementation, the input connector 160in may be on the control sector 153a.

In an implementation, the control unit 150a may be divided according to angles into sectors in FIG. 8B, or the control unit 150a may be divided in a radius direction into sectors. If desired, the control unit 150a may not be divided into sectors, and the power supply unit, the motor controller, and the power converter may be at arbitrary positions.

Referring to FIG. 8C, in the actuator unit 100, the control unit 150 may be formed such that a plurality of boards are stacked, like in FIG. 8A. In an implementation, the sensor board 133 may be further provided on or over the control unit 150, unlike in FIG. 8A.

The sensor board 133 may be on a top surface of the sensor frame 131 as shown in FIG. 2. In an implementation, the sensor board 133 may be on or over the control unit 150 as shown in FIG. 8C in consideration that the sensor board 133 may be disposed along with boards of the control unit 150 because they are all boards and that the sensor board 133 has a control function. If desired, a stacked structure including the sensor board 133 may be defined as the control unit 150.

When the sensor board 133 is on or over the control unit 150, the sensor cable 650 may connect the sensor board 133 and the sensor of the sensor frame 131. The sensor board 133 may be on over the control unit 150, and the sensor board 133 and the control board 153 may be simply connected to each other through a vertical connection structure therebetween without an additional cable.

Figure 9A:
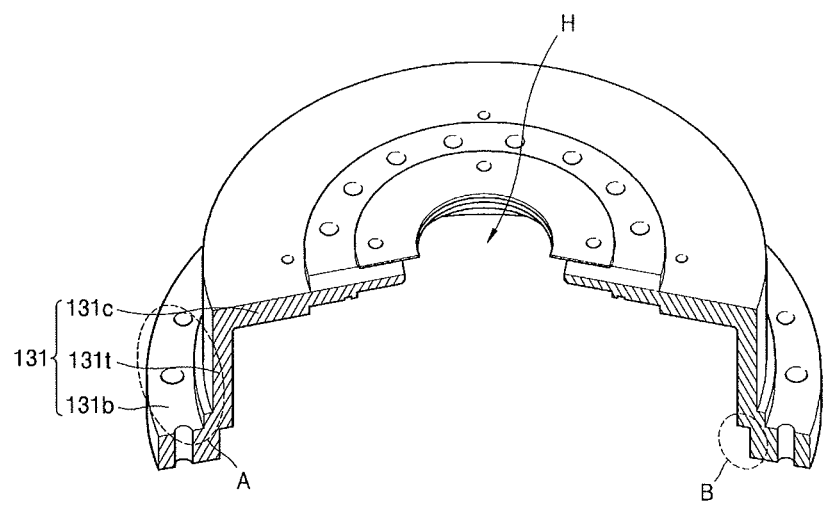
FIGS. 9A and 9B illustrate perspective views of a structure of a sensor frame included in the sensor unit of the actuator unit of FIG. 2 and a structure in which the sensor frame and a sensor board are coupled to each other.
Figure 9B:
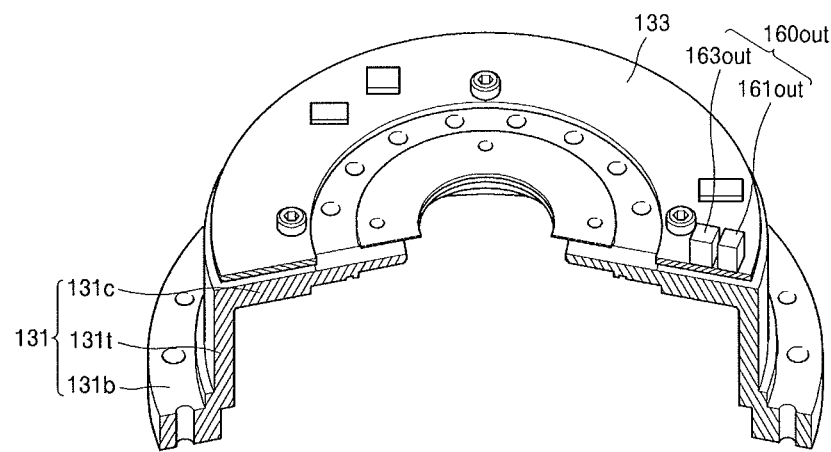

FIGS. 9A and 9B illustrate perspective views of a structure of the sensor frame 131 included in the sensor unit 130 of the actuator unit 100 of FIG. 2 and a structure in which the sensor frame 131 and the sensor board 133 are coupled to each other. The following will be explained with reference to FIGS. 1A, 1B, 2, 3A, and 3B for better understanding.

Referring to FIGS. 9A and 9B, in the actuator unit 100, the sensor frame 131 may include a circular upper plate 131c, a cylindrical side unit 131t, and a circular visor 131b, and may have a substantially top hat or silk hat-like shape. The sensor frame 131 having the top hat or silk hat-like shape may partially cover tops of the frame unit 140 and the driving unit 120 as shown in FIG. 2.

A circular hole H (into which the central hollow shaft 110 may be inserted) may be formed in a central portion of the circular upper plate 131c. Also, a strain gauge (not shown) may be attached to the circular upper plate 131c or the cylindrical side unit 131t to act as a torque sensor. If desired, the circular upper plate 131c may have a spoke-like shape, and the strain gauge may be attached to the circular upper plate 131c having the spoke-like shape.

In the actuator unit 100 of FIGS. 9A and 9B, about 8 strain gauges may be attached to the sensor frame 131 to form a torque sensor. In an implementation, 7 or fewer or 9 or more strain gauges may be mounted on the sensor frame 131. An acceleration sensor or a tile sensor other than a torque sensor may be mounted on the sensor frame 131 to monitor a state of the robot 1000.

The sensor coupling unit 135 may be coupled to a bottom surface of the circular upper plate 131c, and the sensor board 133 may be coupled to a top surface of the circular upper plate 131c. The sensor coupling unit 135 may be coupled to the bottom surface of the circular upper plate 131c, and the sensor frame 131 may receive rotational torque from the decelerator 123 that is under the sensor coupling unit 135 through the sensor coupling unit 135, thereby enabling the torque sensor mounted on the sensor frame 131 to accurately measure torque.

The sensor board 133 may be on and coupled to the top surface of the circular upper plate 131c as shown in FIG. 9B. The sensor board 133 may be directly on the top surface of the circular upper plate 131c, and the sensor board 133 may directly receive and amplify a signal from the torque sensor, thereby minimizing a signal error due to noise. The output connector 160out may be on a top surface of the sensor board 133 as shown in FIGS. 9A and 9B.

The cylindrical side unit 131t may have a circular tubular or cylindrical shape that extends downwardly from an outer end portion or edge of the circular upper plate 131c as shown in FIGS. 9A and 9B. The cylindrical side unit 131t may separate the circular upper plate 131c from the circular visor 131b, and thus may minimize disturbance due to strain that is generated in a vertical and/or horizontal direction at a circular visor portion from being transmitted to the circular upper plate 131c. Accordingly, the cylindrical side unit 131t may enable the torque sensor to detect only relatively accurate rotational torque. For example, the cylindrical side unit 131t may separate a measuring unit (e.g., the circular upper plate 131t on which the torque sensor is disposed) from a fixed unit (e.g., the circular visor 131b to which a horizontal arm is fixed) to achieve an offset frame structure that is strong against crosstalk.

The circular visor 131b may extend outwardly in the horizontal direction from a lower end portion or edge of the cylindrical side unit 131t, and the circular visor 131b may have a circular flange structure. A link coupling unit A may be formed on the circular visor 131b. For example, the first and second horizontal arms 410 and 420 may be coupled to the link coupling unit A.

As a result, a rotational force of the motor 121 may be transmitted to the sensor frame 131 through the decelerator 123 and may be transmitted to the first and second horizontal arms 410 and 420 through the circular visor 131b of the sensor frame 131, thereby making the first horizontal arms 410 and 420 rotate. The first and second horizontal arms 410 and 420 may be very heavy, and strain may be generated in the vertical and/or horizontal direction and may be transmitted to the circular upper plate 131c, to act as disturbance. Accordingly, the cylindrical side unit 131t may help minimize such disturbance as described above.

A cross roller bearing (CRB) fixing unit B may be formed on an inner portion of the sensor frame 131 that corresponds to the circular visor 131b. The CRB may be the frame support bearing 147a of FIG. 2, and the CRB fixing unit B may be a portion of the sensor frame 131 that is fixedly supported by the connection frame 135 through the CRB.

Figure 10A:
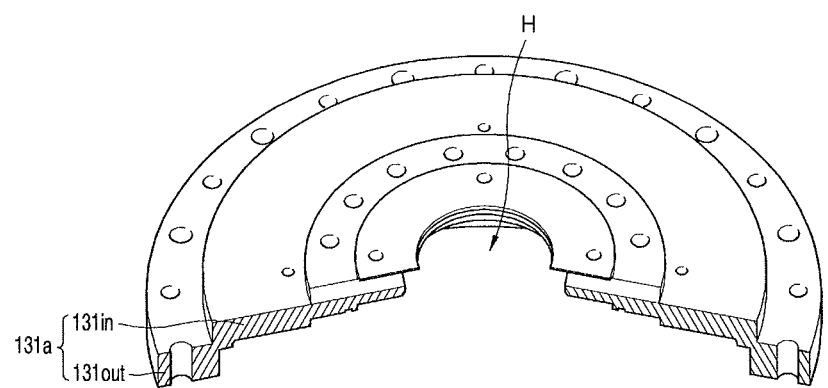
FIGS. 10A and 10B illustrate perspective views of a structure of a sensor frame and a structure in which the sensor frame and the sensor board are coupled to each other, unlike in FIGS. 9A and 9B.
Figure 10B:
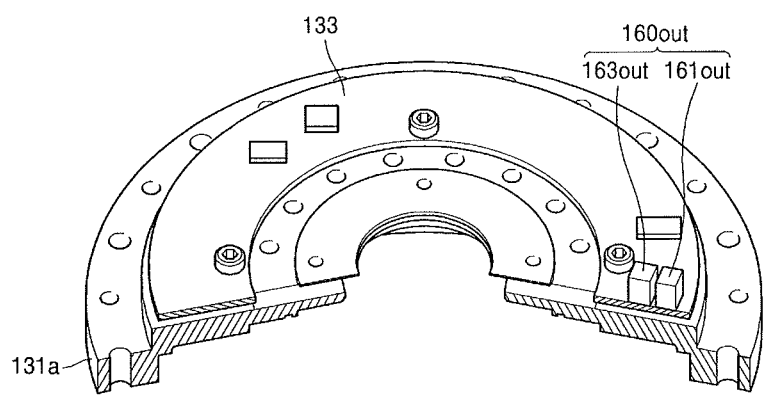

FIGS. 10A and 10B illustrate perspective views of a structure of a sensor frame 131a and a structure in which the sensor frame 131a and the sensor board 133 are coupled to each other. The description already made in FIGS. 9A and 9B may be briefed or omitted for better understanding.

Referring to FIGS. 10A and 10B, in the actuator unit 100, the sensor frame 131a may include an inner plate 131in having a circular shape and an outer plate 131out having a circular shape, and may have a substantially circular planar structure.

The inner plate 131in may have a shape similar to that of the circular upper plate 131c of FIG. 9A. For example, the circular hole H (into which the central hollow shaft 110 may be inserted) may be formed in a central portion of the inner plate 131in. Also, a plurality of strain gauges (not shown) may be attached to the inner plate 131in, to act as a torque sensor. Also, if desired, the inner plate 131in may have a spoke-like shape, and the strain gauges may be attached to the inner plate 131in having the spoke-like shape. The sensor coupling unit 135 may be coupled to a bottom surface of the inner plate 131in, and the sensor board 133 may be coupled to a top surface of the inner plate 131in as shown in FIG. 10B. Accordingly, the torque sensor may relatively accurately measure torque, and the sensor board 133 may directly receive and amplify a signal from the torque sensor, thereby minimizing a signal error due to noise.

The outer plate 131out may correspond to the circular visor 131b of the sensor frame 131 of FIG. 9A or 9b. However, unlike in the sensor frame 131 of FIG. 9A or 9B, the outer plate 131 out may be formed by directly extending outwardly in the horizontal direction from an outer end portion of the inner plate 131 in without a medium such as the cylindrical side unit 131t. Accordingly, the outer plate 131out may have a circular flange structure, like the circular visor 131b. A link coupling unit may be formed on the outer plate 131out, like in the circular visor 131b, and for example, the first and second horizontal arms 410 and 420 may be coupled to the link coupling unit.

The sensor frame 131a of FIGS. 10A and 10B may be used when disturbance in the vertical and/or horizontal direction does not need to be blocked because the first and second horizontal arms 410 and 420 coupled to the link coupling unit are relatively light and thus strain in the vertical and/or horizontal direction is rarely generated. The sensor frame 131a may have a simple circular planar structure, and the sensor frame 131a may be easily manufactured and may reduce a size of the actuator unit 100.

FIGS. 11A through 11D illustrate perspective views of various structures of the sensor coupling unit 135 included in the sensor unit 130 of the actuator unit 100 of FIG. 2. The following will be explained with reference to FIGS. 1A, 1B, 2, 3A, and 3B for better understanding.

Figure 11A:
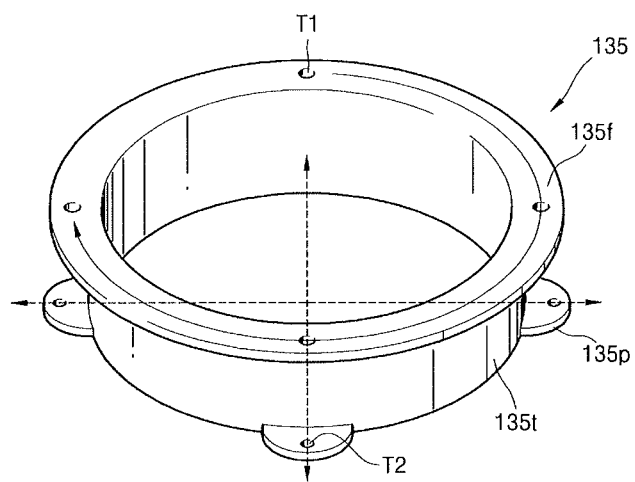
FIGS. 11A through 11D illustrate perspective views of various structures of a sensor coupling unit included in the sensor unit of the actuator unit of FIG. 2.

Referring to FIG. 11A, in the actuator unit 100, the sensor coupling unit 135 may include a body 135t, a frame flange 135*f*, and a decelerator flange 135*p*. The body 135*t* may have a circular tubular or cylindrical shape whose both sides are open.

The frame flange 135*f* may have a circular annular shape that extends outwardly in the horizontal direction from a top surface or edge of the body 135*t*. The frame flange 135*f* may be coupled to the sensor frame 131. Accordingly, first coupling grooves T1 for screw connection may be formed in the frame flange 135*f*. In an implementation, 4 first coupling grooves T1 may be formed in the frame flange 135*f*, as in FIG. 11A, or 3 or fewer or 5 or more first coupling grooves T1 may be formed.

The decelerator flange 135*p* may have a plurality of protruding plates that protrude outwardly in the horizontal direction from a bottom surface or edge of the body 135*t*. In an implementation, the decelerator flange 135*p* may protrude inwardly from the bottom surface or edge of the body 135*t* according to a structure or a size of the decelerator 123 that is coupled to the decelerator flange 135*p*. The decelerator 123 may be coupled to the decelerator flange 135*p*. Accordingly, a second coupling groove T2 for screw connection may be formed in each of the protruding plates of the decelerator flange 135*p*. In an implementation, a number of the protruding plates of the decelerator flange 135*p* may be 4 to correspond to the first coupling grooves T1 of the frame flange 135*f*, or 3 or fewer or 5 or more protruding plates of the decelerator flange 135*p* may be formed.

In an implementation, the number of the protruding plates of the decelerator flange 135*p* may be equal to or different from the number of the first coupling grooves T1 of the frame flange 135*f*. Even when the number of the protruding plates of the decelerator flange 135*p* and the number of the first coupling grooves T1 are equal to each other, positions of the protruding plates of the decelerator flange 135*p* and may be the same as or different from positions of the first coupling grooves T1 of the frame flange 135*f*.

Due to structural characteristics, the sensor coupling unit 135 may have relatively high rigidity in the rotation direction, and may have relatively low rigidity in the vertical and/or horizontal direction on a vertical plane perpendicular to the central hollow shaft 110. Accordingly, the sensor may measure pure torque information that is not affected by disturbance.

For example, due to structural characteristics, the sensor coupling unit 135 may have high rigidity in the rotation direction as marked by a circular solid arrow. For example, the sensor coupling unit 135 may have rigidity high enough to substantially transmit circular torque from the decelerator 123 in the rotation direction to the sensor frame 131. The sensor coupling unit 135 may have low rigidity in the vertical and/or horizontal direction marked by a dashed straight arrow due to its structure characteristics. For example, the sensor coupling unit 135 may have rigidity low enough to barely transmit disturbance due to strain in the vertical and/or horizontal direction from the decelerator 123 to the sensor frame 131.

Figure 11B:
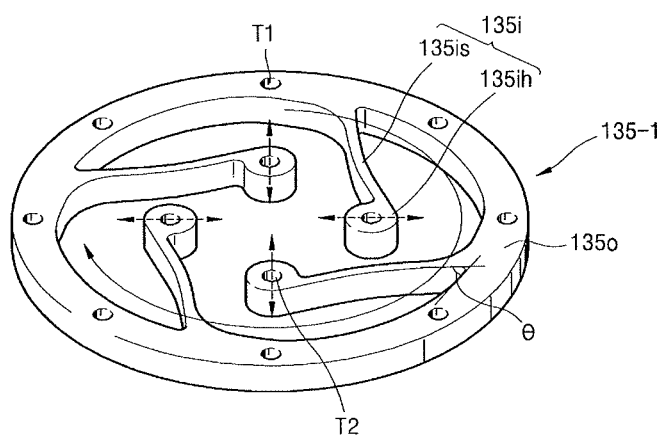

Referring to FIG. 11B, in the actuator unit 100, a sensor coupling unit 135-1 may include an outer flange 135*o* and an inner flange 135*i*. The sensor coupling unit 135-1 may not include the body 135*t*, unlike the sensor coupling unit 135 of FIG. 11A.

The outer flange 135*o* may have a circular annular shape that corresponds or is analogous to the frame flange 135*f* of the sensor coupling unit 135 of FIG. 11A. The sensor frame 131 may be coupled to the outer flange 135*o*. Accordingly, the first coupling grooves T1 may be formed in the outer flange 135*o*. In an implementation, 8 first coupling grooves T1 may be formed, as in FIG. 11B, or 7 or fewer or 9 or more first coupling grooves T1 may be formed.

The inner flange 135*i* may correspond to or be analogous to the decelerator flange 135*p* of the sensor coupling unit 135 of FIG. 11A. The inner flange 135*i* may have a plurality of protrusions that extend from an inner surface of the outer flange 135*o* (having the circular annular shape) and may have a bean sprout or half note (♪)-like shapes. For example, the protrusions of the inner flange 135*i* may have a structure in which a bulbous portion is at the end of a relatively long and skinny base. For example, each of the protrusions of the inner flange 135*i* may include a stem portion 135*is* and a head portion 135*ih*. For example, the stem portion 135*is* of each of the protrusions of the inner flange 135*i* may extend inwardly from the inner surface of the outer flange 135*o*, and the head portion 135*ih* of each of the protrusions of the inner flange 135*i* may be on an end of the stem portion 135*is*, so that the inner flange 135*i* may be located inside the outer flange 135*o* (having the circular annular shape).

The decelerator 123 may be coupled to the inner flange 135*i*. Accordingly, the second coupling grooves T2 may be formed in the head portions 135*ih* of the protrusions of the inner flange 135. In an implementation, the number of the protrusions of the inner flange 135*i* may be 4, as shown in FIG. 11B, or 3 or fewer or 5 or more protrusions of the inner flange 135*i* may be formed. Also, the number of the protrusions of the inner flange 135*i* may be different from the number of the first coupling grooves T1 of the outer flange 135*o* in FIG. 11B. Alternatively, the number of the protrusions of the inner flange 135*i* and the number of the first coupling grooves T1 of the outer flange 135*o* may be equal to each other.

The stem portion 135*is* of each of the protrusions of the inner flange 135*i* may extend from the inner surface of the outer flange 135*o* such that an angle θ with respect to a tangent line of the circular annular shape is an acute angle. Accordingly, an extension direction in which the stem portion 135*is* of each of the protrusions of the inner flange 135*is* extends may correspond to the rotation direction marked by a circular solid arrow. Due to structural characteristics, the sensor coupling unit 135-1 may have relatively high rigidity in the rotation direction, and may have low rigidity in the vertical and/or horizontal direction on a horizontal plane perpendicular to the central hollow shaft 110. Accordingly, the sensor may measure pure torque information that is not affected by disturbance.

For example, when rotational torque is generated in the rotation direction (as marked by a circular solid arrow) in the decelerator 123 (that is coupled to the inner flange 135*i* of the sensor coupling unit 135-1), the rotational torque may be substantially transmitted to the sensor frame 131 through the outer flange 135*o*. Accordingly, the sensor coupling unit 135-1 may have a high rigidity in the rotation direction marked by the circular solid arrow. When strain is generated in the vertical and/or horizontal direction (as marked by a dashed straight arrow) in the decelerator 123, the strain may be barely transmitted to the outer flange 135*o*, and thus may be barely transmitted to the sensor frame 131. As a result, the sensor coupling unit 135-1 may have a low rigidity in the vertical and/or horizontal direction as marked by the dashed straight arrow.

Figure 11C:
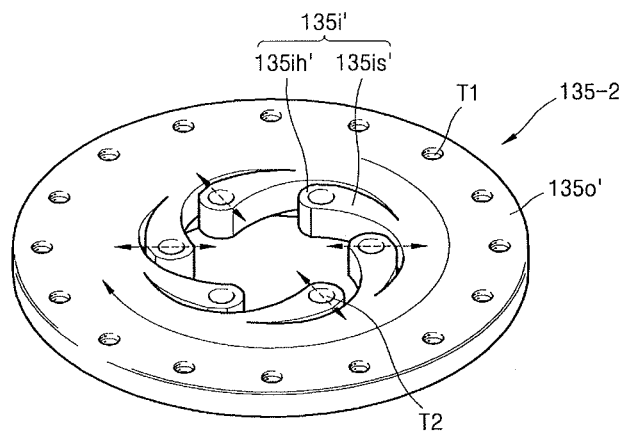

Referring to FIG. 11C, in the actuator unit 100, a sensor coupling unit 135-2 may have a structure similar to a structure of the sensor coupling unit 135-1 of FIG. 11B. However, detailed structures of an outer flange 135*o*' and an inner flange 135*i'* may be different from those of the sensor coupling unit 135-1 of FIG. 11B.

For example, the outer flange 135*o'* may have a substantially circular annular shape, and may have a width that is greater than that of the outer flange 135*o* of the sensor coupling unit 135-1 of FIG. 11B. Accordingly, an open area inside the sensor coupling unit 135-2 may be less than an open area inside the sensor coupling unit 135-1 of FIG. 11B. Also, a plurality of the first coupling grooves T1 may be formed in an outer edge portion of the outer flange 135*o'*. The number of the first coupling grooves T1 may vary according to a structure of the sensor frame 131 that is coupled to top surface of the sensor coupling unit 135-2.

The inner flange 135*i'* may have protrusions, each including a head portion 135*ih'* and a stem portion 135*is'*, like the inner flange 135*i* of the sensor coupling unit 135-1 of FIG. 11B. However, a detailed structure of the inner flange 135*i'* is different from that of the inner flange 135*i* of the sensor coupling unit 135-1 of FIG. 11B. For example, the inner flange 135*i'* may be formed such that a horizontal cross-sectional area increases as each of the protrusions extends in a curved shape in the rotation direction from an inner surface of the outer flange 135*o'*. The decelerator 123 may be coupled to the inner flange 135*i'* through the second coupling grooves T2 in ends of the head portions 135*ih'*. In an implementation, the number of the protrusions of the inner flange 135*i'* may be 6, as shown in FIG. 11C, or 5 or fewer or 7 or more protrusions of the inner flange 135*i'* may be formed.

Figure 11D:
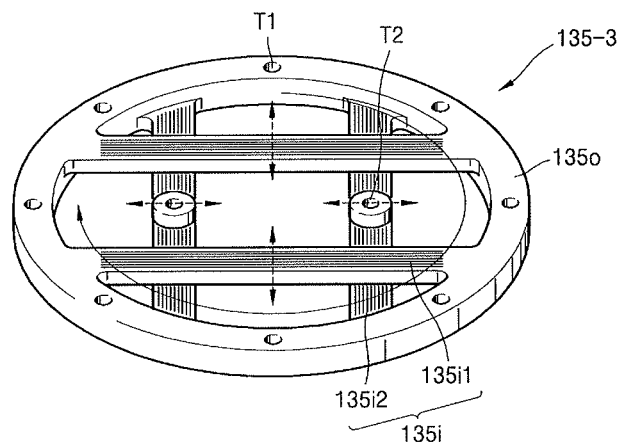

Referring to FIG. 11D, in the actuator unit 100, a sensor coupling unit 135-3 may include the outer flange 135*o* and the inner flange 135*i*. The sensor coupling unit 135-3 may not include the body 135*t*, unlike the sensor coupling unit 135 of FIG. 11A.

The outer flange 135*o* may have a circular annular shape to correspond to or analogous to the frame flange 135*f* of the sensor coupling unit 135 of FIG. 11A. The sensor frame 131 may be coupled to the outer flange 135*o*. Accordingly, the first coupling grooves T1 may be formed in the outer flange 135*o*. In an implementation, 8 first coupling grooves T1 may be formed in the outer flange 135*o*, as in FIG. 11D, or 7 or fewer or 9 or more first coupling grooves T1 may be formed.

The inner flange 135*i* may correspond to or be analogous to the decelerator flange 135*p* of the sensor coupling unit 135 of FIG. 11A, and may have a bridge-like shape that connects insides or inner surfaces of the outer flange 135*o* (having the circular annular shape). For example, the inner flange 135*i* may include a first inner flange 135*i*1 (that connects insides of the outer flanges 135*o* in the horizontal direction) and a second inner flange 135*i*2 (that connects insides of the outer flanges 135*o* in the vertical direction). In an implementation, two first inner flanges 135*i*1 and two second inner flanges 135*i*2 may be provided, as shown in FIG. 11D, or the number of the first inner flanges 135*i*1 and the number of the second inner flanges 135*i*2 may be other than 2.

The second coupling grooves T2 (for coupling the inner flange 135*i* to the decelerator 123) may be formed on center portions of the first inner flanges 135*i*1 and the second inner flanges 135*i*2. For reference, the second coupling grooves T2 of the second inner flanges 135*i*2 are not shown because they face downwardly. The numbers of the first inner flanges 135*i*1 and the second inner flanges 135*i*2, and the numbers and positions of the second coupling grooves T2 formed in the first inner flanges 135*i*1 and the second inner flanges 135*i*2 may vary according to a coupling structure between the inner flange 135*i* and the decelerator 123.

The inner flange 135*i* of the sensor coupling unit 135-3 may be formed of an anisotropic material, and the sensor coupling unit 135-3 may have relatively high rigidity in the rotation direction (as marked by a circular solid arrow), and may have a low rigidity in the vertical and/or horizontal direction as marked by a dashed straight arrow. Accordingly, the sensor may measure pure torque information that is not affected by disturbance.

For example, each of the first inner flanges 135*i*1 and the second inner flanges 135*i*2 may have a multi-layer structure, and anisotropic materials may be arranged to have low rigidity in a disturbance direction, and the above rigidity characteristics may be obtained. For example, assuming that composite materials are used, when fiber directions are arranged as shown in FIG. 11D, the composite materials may be designed to have low rigidity in a disturbance direction. For example, due to the fiber directions, the first inner flanges 135*i*1 may have high rigidity in the horizontal direction and may have low rigidity in the vertical direction as marked by a dashed arrow. In an implementation, the second inner flanges 135*i*2 may have high rigidity in the vertical direction and may have a low direction in the horizontal direction as marked by a dashed arrow. Accordingly, when strain is applied to the inner flange 135*i* in the rotation direction (as marked by a circular solid arrow), the first inner flanges 135*i*1 and the second inner flanges 135*i*2 may have relatively high rigidities, and the strain in the rotation direction may be transmitted to the sensor frame 131 through the outer flange 135*o*. In an implementation, when strain in the vertical and/or horizontal direction is applied as marked by a dashed straight arrow, the strain may not be transmitted to the outer flange 135*o*, and thus may not be transmitted to the sensor frame 131.

In an implementation, any suitable type of actuator unit 100 including a sensor coupling unit having a structure in which strain in the rotation direction is substantially transmitted to the sensor frame 131 and strain in the vertical and/or horizontal direction is blocked from being transmitted to the sensor frame 131 may be used.

Figure 12:
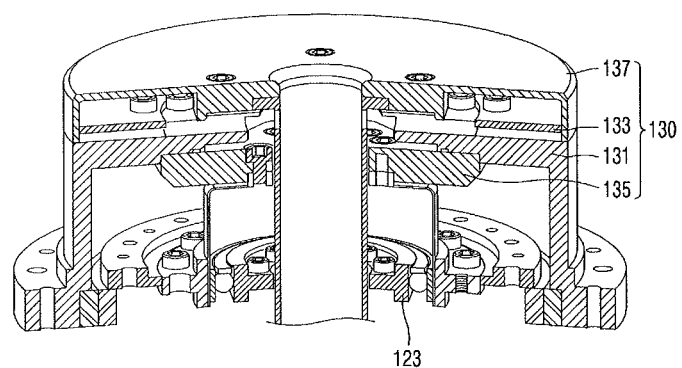
FIG. 12 illustrates a cutaway perspective view of a reducing apparatus that is formed by coupling a decelerator and the sensor unit, according to an embodiment.

FIG. 12 illustrates a cutaway perspective view of a reducing apparatus 900 that is formed by coupling the decelerator 123 and the sensor unit 130, according to an embodiment.

Referring to FIG. 12, the reducing apparatus 900 may include the decelerator 123 and the sensor unit 130. A structure or a function of the decelerator 123, and a structure and a function of the sensor unit 130 have already been explained when the actuator unit 100 of FIG. 2 is explained, and thus an explanation thereof may be briefed or omitted.

In the reducing apparatus 900 of FIG. 12, the decelerator 123 may be a harmonic decelerator. A motor to be decelerated may be coupled to the bottom of the decelerator 123. Also, when the decelerator 123 is a harmonic decelerator, the motor may be coupled to the decelerator 123 in a vertical power transmission structure by using a vertical shaft such as the input hollow shaft 129 of FIG. 2.

The sensor unit 130 may include the sensor frame 131 of FIG. 9A, or the sensor unit 130 may include the sensor frame 131*a* of FIG. 10A. When the sensor frame 131*a* of FIG. 10A is used, the decelerator 123 may have a horizontal structure having a low height. Any of the sensor coupling units 135, 135-1, 135-2, and 135-3 of FIGS. 11A through 11D may be used as the sensor coupling unit 135 that is disposed and coupled between the decelerator 123 and the sensor frame 131. The cover 137 of the sensor unit 130 may be omitted when the sensor board 133 does not need to be protected.

The reducing apparatus 900 of FIG. 12 may accurately sense torque by using the sensor unit 130 that is coupled to and disposed over the decelerator 123, and an operation of the decelerator 123 may be accurately controlled. Also, when an acceleration sensor or a tilt sensor is included in the sensor unit 130, a state of the robot 1000 or a device system including the reducing apparatus 900 may be monitored, thereby ensuring a more stable operation.

By way of summation and review, a joint driving mechanism in a horizontal articulated robot may include a decelerator, a belt/pulley, a tension control device, and a motor/encoder. The horizontal articulated robot, having a structure in which power is transmitted by the belt/pulley, may generate dust due to a belt/pulley mechanism, and a volume and a weight may be increased due to a parallel connection structure of a motor and the decelerator and the addition of the tension control device. A number of cables connected to an external motor controller may increase as a number of joints of the horizontal articulated robot increases, and the cables may be twisted or bent when the horizontal articulated robot moves.

The embodiments may provide an industrial robot that may move an object, an actuator unit, and a robot that applies the actuator unit to each of joints of an articulated arm.

The embodiments may provide a high-density actuator unit and a robot including the same, which may reduce noise, may be made lightweight/small, may improve control reliability and maintainability, minimize the use of energy, and may provide improved control and high-speed operation.

The embodiments also provide a reducing apparatus that may provide accurate operation control.

As described above, an actuator unit according to an embodiment may have a vertical power transmission structure in which all elements are arranged and coupled in series about a central input hollow shaft, and the actuator unit may be made small, lightweight, and simple. Also, all of the elements may be integrated into a module, and maintainability may be improved. Furthermore, a power transmission mechanism may be simplified, and power transmission efficiency may be improved. When the actuator unit having the vertical power transmission structure is applied to each joint of a robot, a joint driving mechanism of the robot may become small, lightweight, and simple, and high-speed operation and energy saving may be ensured.

Each actuator unit according to an embodiment may include a control unit thereinside, and a plurality of the actuator units and a high-level controller may be connected in a daisy-chain fashion through a communication power cable by using the control units. Accordingly, only two cables, e.g., a power cable and a communication cable, may be used, irrespective of the number of the actuator units that are used, and drawbacks due to an increase in the number of cables may be avoided.

Each actuator unit according to an embodiment may include a sensor unit thereinside and thus may detect and control an operation of a driving unit by using a sensor, and improved control such as precise force control or collision detection of the robot may be provided.

A reducing apparatus according to an embodiment may accurately sense a torque sensor by using the sensor unit, and an operation of a decelerator may be accurately controlled.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An actuator unit, comprising:
a driving unit that includes:
a motor that generates a rotational force for rotating an object, a decelerator that is connected to the motor and that reduces a rotation speed according to a deceleration ratio, and
an encoder that detects rotation information of the motor, wherein the decelerator, the motor, and the encoder are vertically coupled through an input hollow shaft;
a sensor unit that includes:
a sensor frame on which a sensor is mounted, a sensor board that amplifies a signal from the sensor, and
a sensor coupling unit that blocks disturbance and noise from the driving unit, the sensor coupling unit being disposed over the driving unit;
a control unit that includes:
a motor controller that controls the motor based on the rotation information of the motor from the encoder, a power converter that converts a current signal from the motor controller into a pulse signal and applies the pulse signal to the motor, and
a power supply unit that converts external main power into power suitable for individual elements and that supplies the suitable power, the power supply unit being coupled to the input hollow shaft and under the driving unit; and
a frame unit that includes:
a motor frame that supports the motor, an encoder frame that supports the encoder, and
a connection frame that connects the driving unit to the sensor units wherein:
the control unit includes a multi-layer board that is coupled to the input hollow shaft, and
the multi-layer board includes:
a control board on which the motor controller is disposed, an amplification board on which the power converter is disposed, and
a power board on which the power supply unit is disposed.

2. The actuator unit as claimed in claim 1, wherein:
the actuator unit has a vertically symmetric structure,
an input connector is on a bottom of the actuator unit,
an output connector is on a top of the actuator unit, and
the input connector and the output connector are connected to each other through an internal cable that extends through a hole in a central hollow shaft that is inside the input hollow shaft.

3. The actuator unit as claimed in claim 1, wherein the decelerator is a harmonic decelerator.

4. The actuator unit as claimed in claim 1, wherein:
the sensor frame includes:
a circular upper plate that has a hole into which the central hollow shaft, which is inside the input hollow shaft, is inserted, a cylindrical side unit that extends downwardly from the circular upper plate, and
a circular visor that extends outwardly in a horizontal direction from a lower end portion of the cylindrical side unit,
the sensor coupling unit is coupled to a bottom surface of the circular upper plate,
the sensor board is coupled to a top surface of the circular upper plate, and
an external coupling unit is on the circular visor.

5. The actuator unit as claimed in claim 1, wherein the sensor is a torque sensor that senses torque of the driving unit.

6. The actuator unit as claimed in claim 1, wherein:
the sensor coupling unit is between the decelerator and the sensor frame, and
the sensor coupling unit:
generates strain in a rotation direction on the sensor frame by transmitting rotational torque of the decelerator to the sensor frame, and
blocks the disturbance by blocking or reducing strain in a direction other than the rotation direction.

7. An actuator unit, comprising:
a driving unit that includes:
a motor that generates a rotational force for rotating an object,
a decelerator that is connected to the motor and that reduces a rotation speed according to a deceleration speed, and
an encoder that detects rotation information of the motor, wherein the decelerator, the motor, and the encoder are vertically coupled through an input hollow shaft;
a sensor unit that includes:
a sensor frame on which a sensor is mounted,
a sensor board that amplifies a signal from the sensor, and
a sensor coupling unit that blocks disturbance and noise from the driving unit, and is on the driving unit; and
a frame unit that includes:
a motor frame that supports the motor,
an encoder frame that supports the encoder, and
a connection frame that connects the driving unit to the sensor unit,
wherein:
the sensor coupling unit includes:
a decelerator flange that is coupled to the decelerator, and
a frame flange that is coupled to the sensor frame,
the sensor coupling unit has:
a first rigidity in a rotation direction having the input hollow shaft as a rotational axis, and
a second rigidity in vertical and horizontal directions on a horizontal plane perpendicular to the input hollow shaft,
the first rigidity is high enough to substantially transmit torque in the rotation direction from the decelerator to the sensor frame, and
the second rigidity is low enough to not substantially transmit the disturbance due to strain in the vertical and horizontal directions from the decelerator to the sensor frame.

8. The actuator unit as claimed in claim 7, wherein:
the sensor is a torque sensor that senses torque of the driving unit,
the sensor coupling unit is between the decelerator and the sensor frame, and
the sensor coupling unit:
generates strain in a rotation direction on the sensor frame by transmitting rotational torque of the decelerator to the sensor frame, and
blocks the disturbance by blocking or reducing strain in a direction other than the rotation direction.

9. The actuator unit as claimed in claim 7, wherein:
the frame flange has a circular annular shape,
the decelerator flange has a plurality of protrusions that extend inwardly from an inner side of the circular annular shaped frame flange and that are coupled to the decelerator, the protrusions having bulbous head portions on ends of narrower stem portions, and
each of the plurality of protrusions extends in a direction such that the stem forms an acute angle with respect to a tangent line of the circular annular shape of the frame flange.

10. The actuator unit as claimed in claim 7, wherein:
the frame flange has a circular annular shape,
the decelerator flange includes a plurality of protrusions that extend inwardly in a curved shape in the rotation direction from an inner side of the circular annular shaped frame flange and that are coupled to the decelerator, and
each of the plurality of protrusions is formed such that a cross-sectional area increases in a direction away from a portion that is coupled to the frame flange toward an end portion of each protrusion.

11. The actuator unit as claimed in claim 7, wherein:
the frame flange has a circular annular shape,
the decelerator flange includes a plurality of bridges that connect insides of the circular annular shaped frame flange and that are coupled to the decelerator, and
the decelerator flange is formed of an anisotropic material having rigidity in an extension direction in which the plurality of bridges extend that is higher than a rigidity in a direction perpendicular to the extension direction.

12. The actuator unit as claimed in claim 7, wherein:
the sensor frame includes:
a circular upper plate that has a hole into which a central hollow shaft that is inside the input hollow shaft is inserted,
a cylindrical side unit that extends downwardly from the circular upper plate, and
a circular visor that extends outwardly in a horizontal direction from a lower end portion of the cylindrical side unit and that partially covers tops of the driving unit and the frame unit,
the sensor coupling unit is coupled to a bottom surface of the circular upper plate,
the sensor board is coupled to a top surface of the circular upper plate, and
an external coupling unit is formed on the circular visor.

13. A robot, comprising:
a base, the base including a high-level controller that generates a control command through computation according to an external task command;
a vertical shaft that is inserted into the base and that is vertically moveable;
an articulated arm that is coupled to the vertical shaft, the articulated arm including at least two joints and at least one horizontal arm that is connected through the at least two joints;
a hand that is coupled to an end joint of the articulated arm, a moving object being holdable in the hand;

an actuator unit in each of the at least two joints, the actuator unit rotating the at least one horizontal arm or the hand and including thereinside a control unit that controls rotation; and
a communication power cable, the communication power cable including:
a communication cable that transmits the control command from the high-level controller, and
a power cable that supplies power,
wherein the communication cable is connected to the actuator unit of each of the at least two joints in a daisy-chain fashion from the high-level controller.

14. The robot as claimed in claim 13, wherein the actuator unit further includes:
a driving unit that includes:
a motor that generates a rotational force for rotating an object,
a decelerator that is connected to the motor and that reduces a rotation speed according to a deceleration ratio, and
an encoder that detects rotation information of the motor, wherein the decelerator, the motor, and the encoder are vertically coupled through an input hollow shaft;
a sensor unit that includes:
a sensor frame on which a sensor is mounted,
a sensor board that amplifies a signal from the sensor, and
a sensor coupling unit that blocks disturbance and noise from the driving unit, the sensor coupling unit being disposed over the driving unit; and
a frame unit that includes:
a motor frame that supports the motor,
an encoder frame that supports the encoder, and
a connection frame that connects the driving unit to the sensor unit,
wherein the control unit includes:
a motor controller that controls the motor based on the rotation information of the motor from the encoder,
a power converter that converts a current signal from the motor controller into a pulse signal and applies the pulse signal to the motor, and
a power supply unit that converts external main power into power suitable for individual elements and that supplies the suitable power, the power supply unit being coupled to the input hollow shaft under the driving unit.

15. The robot as claimed in claim 14, wherein:
the control unit includes a multi-layer board that is coupled to the input hollow shaft,
the multi-layer board includes:
a control board on which the motor controller is disposed,
an amplification board on which the power converter is disposed, and
a power board on which the power supply unit is disposed.

16. The robot as claimed in claim 14, wherein:
an input connector is on a bottom of the actuator unit,
an output connector is on a top of the actuator unit,
the input connector and the output connector are connected to each other through an internal cable that extends through a hole in a central hollow shaft that is inside the input hollow shaft,
the communication power cable that extends through the inside of the vertical shaft from the high-level controller is connected to the input connector of the actuator unit in the joint to which the vertical shaft is coupled, and
the output connector of the actuator unit of one of the two joints is connected through the communication power cable to the input connector of the actuator unit of another of the joints, which actuator units are adjacent to each other.

17. The robot as claimed in claim 14, wherein:
the sensor coupling unit is between the decelerator and the sensor frame,
the sensor coupling unit has:
a first rigidity in a rotation direction about the input hollow shaft, and
a second rigidity in vertical and horizontal directions on a horizontal plane that is perpendicular to the input hollow shaft, and
the second rigidity is less rigid than the first rigidity.

18. The robot as claimed in claim 14, wherein the sensor coupling unit is formed as any one of:
a first type that includes:
a frame flange that has a circular annular shape and that is coupled to the sensor frame, and
a decelerator flange that includes a plurality of protrusions that extend inwardly from an inner side of the circular annular shaped frame flange and that are coupled to the decelerator, the protrusions having bulbous head portions on ends of narrower stem portions, the protrusions being coupled to the decelerator through the head portions,
a second type that includes:
a frame flange that has a circular annular shape and that is coupled to the sensor frame, and
a decelerator flange that includes a plurality of protrusions that extend inwardly in a curved shape in the rotation direction from an inner side of the circular annular shaped frame flange such that a cross-sectional area increases in a direction away from a portion that is coupled to the frame flange toward an end portion of each protrusion and the decelerator flange is coupled to the decelerator through an end portion of each protrusion, and
a third type that includes:
a frame flange that has a circular annular shape and that is coupled to the sensor frame, and
a decelerator flange that includes a plurality of bridges that connect insides of the circular annular shaped frame flange, that is formed of an anisotropic material having a rigidity in an extension direction in which the plurality of bridges extend that is more rigid than a rigidity in a direction perpendicular to the extension direction, and that is coupled to the decelerator through central portions of the plurality of bridges.

19. The robot as claimed in claim 14, wherein:
the sensor frame includes:
a circular upper plate that has another hole into which a central hollow shaft that is inside the input hollow shaft is inserted,
a cylindrical side unit that extends downwardly from the circular upper plate, and
a circular visor that extends outwardly in a horizontal direction from a lower end portion of the cylindrical side unit,
the sensor coupling unit is coupled to a bottom surface of the circular upper plate, the sensor board is coupled to a top surface of the circular upper plate, and the horizontal arm is coupled to the circular visor.

20. A reducing apparatus, comprising:

a decelerator that is coupled to a motor, the motor generating a rotational force for rotating an object, and the decelerator reducing a rotation speed according to a deceleration ratio; and a sensor unit that includes:
- a sensor coupling unit that is coupled to the decelerator, the sensor coupling unit detecting rotational torque of the decelerator and blocking disturbance and noise,
- a sensor frame that is coupled to the sensor coupling unit and allows a sensor for detecting the rotational torque to be mounted thereon, and
- a sensor board on the sensor frame, the sensor board amplifying a signal from the sensor, wherein:

the sensor frame includes:
- a circular upper plate that has another hole into which a central hollow shaft that is inside the input hollow shaft is inserted,
- a cylindrical side unit that extends downwardly from the circular upper plate, and
- a circular visor that extends outwardly in a horizontal direction from a lower end portion of the cylindrical side unit, the sensor coupling unit is coupled to a bottom surface of the circular upper plate, the sensor board is coupled to a top surface of the circular upper plate, and an external device that receives rotational torque from the decelerator is coupled to the circular visor.

21. The reducing apparatus as claimed in claim 20, wherein the sensor coupling unit is formed as any one of:

a first type that includes:
- a frame flange that has a circular annular shape and that is coupled to the sensor frame, and
- a decelerator flange that includes a plurality of protrusions that extend inwardly from an inner side of the circular annular shaped frame flange and that are coupled to the decelerator, the protrusions having bulbous head portions on ends of narrower stem portions, the protrusions being coupled to the decelerator through the head portions, a second type that includes:
- a frame flange that has a circular annular shape and that is coupled to the sensor frame, and
- a decelerator flange that includes a plurality of protrusions that extend inwardly in a curved shape in the rotation direction from an inner side of the circular annular shaped frame flange such that a cross-sectional area increases in a direction away from a portion that is coupled to the frame flange toward an end portion of each protrusion and the decelerator flange is coupled to the decelerator through the end portion of each protrusion, and a third type that includes:
- a frame flange that has a circular annular shape and that is coupled to the sensor frame, and
- a decelerator flange that includes a plurality of bridges that connect insides of the circular annular shaped frame flange, that is formed of an anisotropic material having a rigidity in an extension direction in which the plurality of bridges extend that is more rigid than a rigidity in a direction perpendicular to the extension direction, and that is coupled to the decelerator through central portions of the plurality of bridges.

* * * * *